US011947368B2

(12) United States Patent
Lowe et al.

(10) Patent No.: US 11,947,368 B2
(45) Date of Patent: Apr. 2, 2024

(54) APPARATUS, SYSTEMS, AND METHODS FOR INTEGRATED ENVIRONMENTAL INFANT PRAM, PET MAT AND INFANT FOOTMUFF

(71) Applicant: CHILL BABY TECHNOLOGIES, LLC, Loomis, CA (US)

(72) Inventors: Jason A. Lowe, Eastleigh (GB); Taylor A. Catherwood, Loomis, CA (US)

(73) Assignee: Chill Baby Technologies, LLC, Loomis, CA (US)

( * ) Notice: Subject to any disclaimer, the term of this patent is extended or adjusted under 35 U.S.C. 154(b) by 592 days.

(21) Appl. No.: 17/309,110

(22) PCT Filed: Aug. 22, 2019

(86) PCT No.: PCT/IB2019/057062
§ 371 (c)(1),
(2) Date: Apr. 24, 2021

(87) PCT Pub. No.: WO2020/089704
PCT Pub. Date: May 7, 2020

(65) Prior Publication Data
US 2022/0019250 A1    Jan. 20, 2022

Related U.S. Application Data

(60) Provisional application No. 62/752,819, filed on Oct. 30, 2018.

(51) Int. Cl.
*G05B 19/042*    (2006.01)
*G05D 23/19*    (2006.01)
(Continued)

(52) U.S. Cl.
CPC ....... *G05D 23/1905* (2013.01); *G05B 19/042* (2013.01); *G05D 23/1931* (2013.01);
(Continued)

(58) Field of Classification Search
CPC .................................................. G05B 19/042
See application file for complete search history.

(56) References Cited

U.S. PATENT DOCUMENTS 7,320,223 B1 *  1/2008  Dabney ................ B60N 2/2845
                                                             62/3.61
2008/0022935 A1  1/2008  Fine
(Continued)

FOREIGN PATENT DOCUMENTS

JP          3149754 U    4/2009
KR   20-2009-0012164 U   12/2009
(Continued)

*Primary Examiner* — Gary Collins
(74) *Attorney, Agent, or Firm* — Charles L. Thoeming

(57) ABSTRACT

Integrated environmental infant pram, pet mat, and an integrated environmental infant footmuff are disclosed. System apparatus provides programmable heating/cooling functions, real-time monitoring of the temperature of the pram, mat or footmuff, programmable alarm settings, Bluetooth proximity location, wireless and/or Bluetooth connectivity to separate handheld digital devices, weight sensor inputs, a rechargeable battery power supply with recharging/power connectivity, and microprocessor control of heating/cooling, sensory input/output functions, and communication functions. Embodiments of the infant prams are disclosed as original manufactured equipment or an adaptable retrofit assembly. An artificial intelligence component of the programmable heating/cooling method is also disclosed.

13 Claims, 18 Drawing Sheets

(51) Int. Cl.
 *B62B 9/10* (2006.01)
 *H04L 67/12* (2022.01)
 *H04W 4/38* (2018.01)

(52) U.S. Cl.
 CPC .......... *B62B 9/102* (2013.01); *B62B 2204/02* (2013.01); *B62B 2204/04* (2013.01); *G05B 2219/25252* (2013.01); *G05B 2219/2614* (2013.01); *H04L 67/12* (2013.01); *H04W 4/38* (2018.02)

(56) References Cited

U.S. PATENT DOCUMENTS

| | | | |
|---|---|---|---|
| 2008/0084040 A1* | 4/2008 | McGowan | B62B 9/00 280/47.38 |
| 2008/0271464 A1 | 11/2008 | Crippen et al. | |
| 2010/0011502 A1* | 1/2010 | Brykalski | A61G 7/05 5/423 |
| 2010/0319627 A1 | 12/2010 | Cauchy | |
| 2016/0101803 A1 | 4/2016 | Ahlemeier | |
| 2018/0236913 A1 | 8/2018 | Abreu | |
| 2020/0396958 A1* | 12/2020 | Eways | A01K 1/0353 |

FOREIGN PATENT DOCUMENTS

| | | |
|---|---|---|
| KR | 10-2011-0042749 A | 4/2011 |
| KR | 10-2017-0106712 A | 9/2017 |
| KR | 10-1863193 B1 | 7/2018 |

* cited by examiner

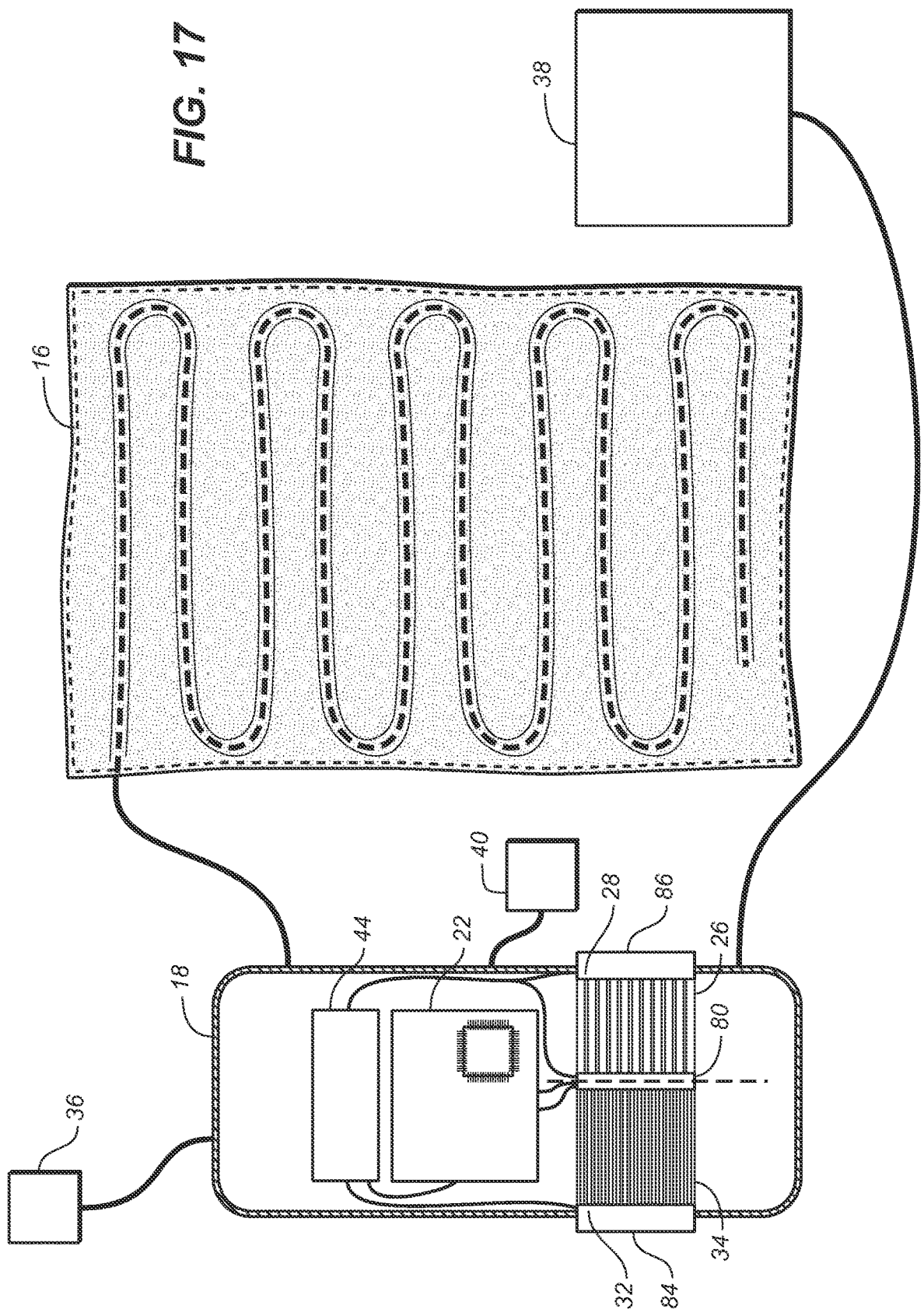

APPARATUS, SYSTEMS, AND METHODS FOR INTEGRATED ENVIRONMENTAL INFANT PRAM, PET MAT AND INFANT FOOTMUFF

TECHNICAL FIELD

This invention relates to the improvement of integrated environmental mats. More particularly, the present invention relates to apparatus, systems, and methods providing integrated environmental infant pram, integrated environment pet mat, or an integrated environmental infant footmuff adaptable to multiple use environments, and including heating, cooling, remote control, alarm, and wireless connectivity or Bluetooth functions within the pram, mat or footmuff.

BACKGROUND OF THE INVENTION

Numerous products on the market are provided for increasing the comfort and/or utility of an infant safety car seat, including heating and cooling the safety car seat environment, providing one or more sensors to detect an infant in the safety car seat.

Other products provide a vehicle infant safety alert system comprises a seat sensor and an alarm fob or provide an alert when an infant or infant is in an infant safety seat in a vehicle.

There is thus a need for a disclosed integrated infant or pet environmental mat or an infant footmuff that when compared with the prior art have these advantages: a temperature regulating device to provide dual heating or cooling functions around a range of input temperature set points and facilitate the temperature comfort of the integrated environmental infant or pet mat or infant footmuff; integral temperature sensors, pressure sensors and/or weight sensors that communicate with an integrated microprocessor which controls the temperature regulating device and which communicates with at least one external digital device and/or one external microprocessor-based system by wireless or Bluetooth connectivity; and an integral power supply provides rechargeable power for all electronic components within the mat.

An object of the integrated environmental infant pram or pet mat or infant footmuff provides a thermostatically controlled environment for an infant pram or pet on a mat, or in an infant in a footmuff.

Another object of the integrated environmental infant footmuff provides portable thermostatically controlled environment for an infant that can be readily adapted to a portable infant seat, infant safety car seat, pram, or stroller/pushchair.

A further object of the integrated environmental infant footmuff is to snugly and removably fit into an existing portable infant seat, infant safety car seat, pram, or a stroller/pushchair.

An added object of the integrated infant pram or pet environmental mat or infant footmuff provides detection of the presence and/or weight of an infant or pet contacting the mat or an infant contacting the infant footmuff.

A further objective of the integrated environmental infant pram or pet mat or infant footmuff is to sound an alarm and/or provide an alarm to at least one external digital and/or one external microprocessor-based system when a defined locational variance is detected between the at least one digital and/or one external microprocessor-based system and the environmental pram, mat or footmuff.

DISCLOSURE OF INVENTION

The disclosed integrated environmental infant pram, pet mat and infant footmuff includes semi-rigid flexible mat material or backing manufactured from organic fibers. An embodiment of the assembled integrated environmental infant pram and pet mat and infant footmuff includes: 1) a temperature control unit comprising an integrated microprocessor system to at least control the temperature of small closed environment and surface of the mat or footmuff; 2) a control unit discharge header communicating with a small closed environment providing at least one channel between the flexible mat bottom surface and the flexible mat top surface to house and contain the flow of chilled or heated air within the at least one channel; 3) assembly to communicate with the control unit to control the temperature of the pram, mat or footmuff small closed environment and surface contacting the infant or pet and to regulate that small closed environment and mat surface temperature consistent with set points determined by the user and the integrated microprocessor system; 4) an array of superheating heating elements in the fabric of the flexible mat top surface; 5) at least one temperature sensor providing input to the integrated microprocessor system; 6) at least one weight sensor providing input to the microprocessor system; 7) a rechargeable battery power supply connected to and providing power for the integrated microprocessor system, the assembly to regulate the temperature of the mat surfaces, the at least one temperature sensor, the at least one weight sensor; and 8) Bluetooth and/or wireless connectivity of the integrated microprocessor system to at least one external digital device or microprocessor-based system. As disclosed, an embodiment of the integrated environmental infant pram is suitable for placement in multiple user environments including, without limitation, infant car seats, infant prams, infant strollers, and infant portable carriers. As disclosed, yet another embodiment of the integrated environmental is suitable for placement in multiple user environments including, without limitation, pet beds. As disclosed, a further embodiment of the integrated environmental infant footmuff is suitable for placement in multiple user environments including, without limitation an infant footmuff as part of a portable thermostatically controlled environment for an infant that can be readily adapted to a portable infant seat, infant safety car seat, pram, or stroller/pushchair.

According to an embodiment of the integrated environmental infant pram, pet mat, or the infant foot muff, the assembly to communicate with the integrated microprocessor system to control mat temperature and to regulate the mat surface temperature consistent with set points determined by the integrated microprocessor system set points includes at least two discrete circuits, one heating circuit and one cooling circuit.

According to an embodiment of the integrated environmental infant pram, pet mat, or infant footmuff, wireless connectivity of the integrated microprocessor system to at least one external microprocessor-based system comprises Bluetooth.

According to an embodiment of the integrated environmental infant pram, pet mat, or infant footmuff, the integrated microprocessor system alerts the at least one external microprocessor-based system when the pressure sensor detects an infant's or pet's presence on the integrated infant environmental mat.

According to an embodiment of the integrated environmental infant pram, pet mat, or infant footmuff, the integrated microprocessor system provides an alarm to the at least one external microprocessor-based system when a Bluetooth proximity positioning system transmitter indicates that the integrated microprocessor system is more than a desired preset distance from the at least one external microprocessor-based system.

Embodiments of the integrated environmental infant pram mat are presented as retrofitted additions to an existing pram or stroller.

Embodiments of the integrated environmental infant pram are presented as original manufactured equipment for an infant pram or a stroller.

BRIEF DESCRIPTION OF DRAWINGS

These and other features, aspects, and advantages of the integrated environmental infant pram, pet mat, or infant footmuff, will become better understood regarding the following description, and drawings as further described.

FIG. 7 is schematic depicting the relationship of FIGS. 7A and 7B.

FIG. 17 is a system view of the heating/cooling apparatus 12 of FIG. 2B for the embodiment of integrated environmental infant footmuff 310 of FIG. 15.

BEST MODE FOR CARRYING OUT THE INVENTION

Embodiments of the apparatus, systems, and methods for disclosed embodiments of integrated environmental infant pram 10, the integrated environmental pet mat 210, and the integrated environmental footmuff 310, are depicted generally in FIGS. 1-17. As disclosed herein, the small, enclosed environment provides the environment for which the apparatus, systems, and methods for disclosed embodiments of integrated environmental infant pram 10, the integrated environmental pet mat 210, and the integrated environmental footmuff 310 control the temperature. For embodiments of the apparatus, systems, and methods for the integrated environmental pet mat 210 and the integrated environmental footmuff 310, the small, enclosed environment is space defined by the assembled integrated environmental pet mat 210 or the assembled integrated environmental footmuff 310. For embodiments of the apparatus, systems, and methods for the integrated environmental for the infant pram 10, the small, enclosed environment is space defined by the interior of a pram and a top cover over that interior. The top cover for the small, closed environment of the pram can be a blanket, the extended pram cover, or a separate fitted piece to house the infant's body within the interior of the pram all provided by the user depending on the weather and the user's desired dynamics with the infant while the pram is in use (not shown).

Figure 1:
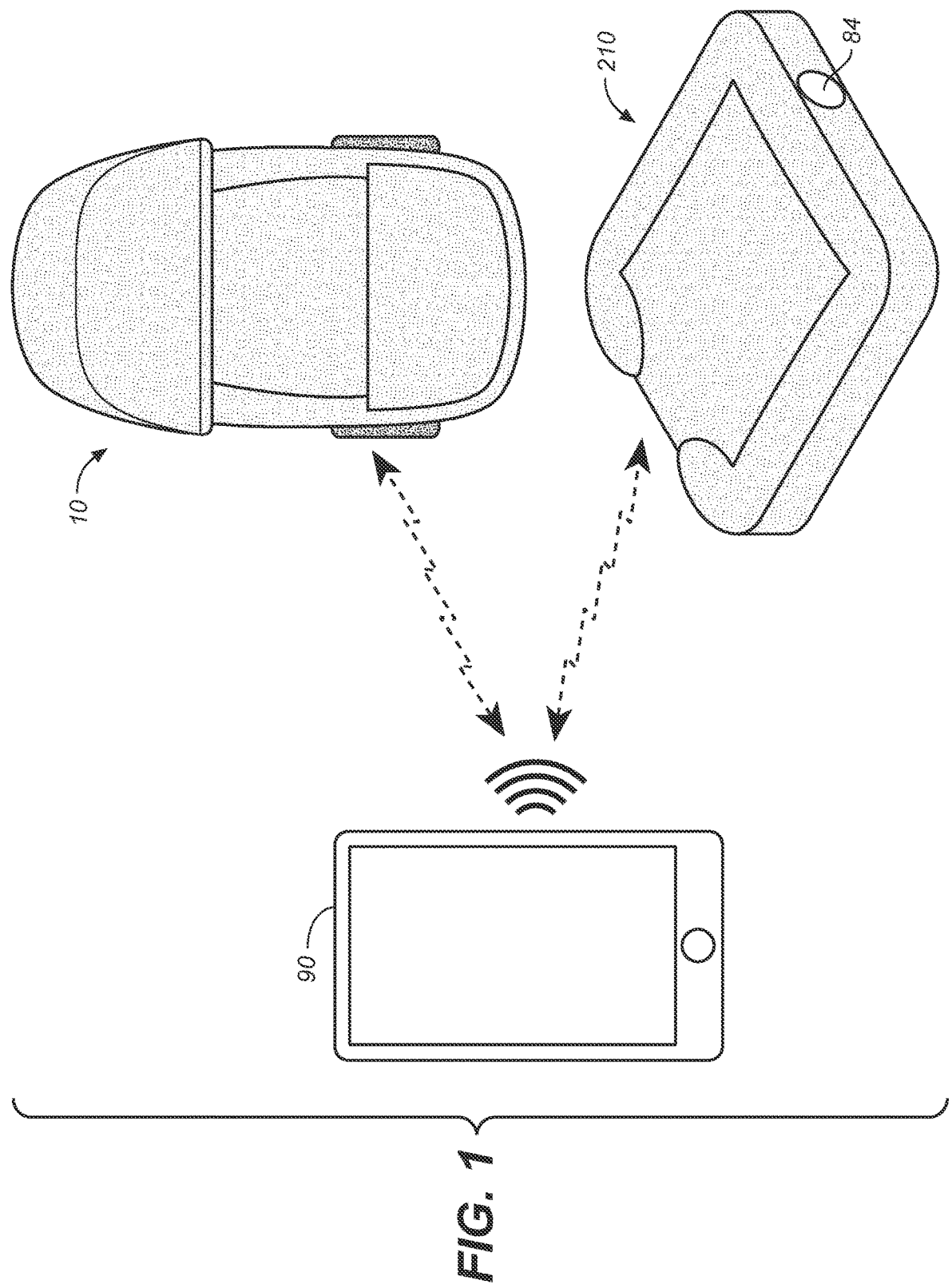
FIG. 1 is a system schematic view of wireless communication between a separate handheld digital device 90 and an embodiment of the integrated infant environmental infant pram 10 and an embodiment of the integrated environmental pet mat 210.
Figure 2A:
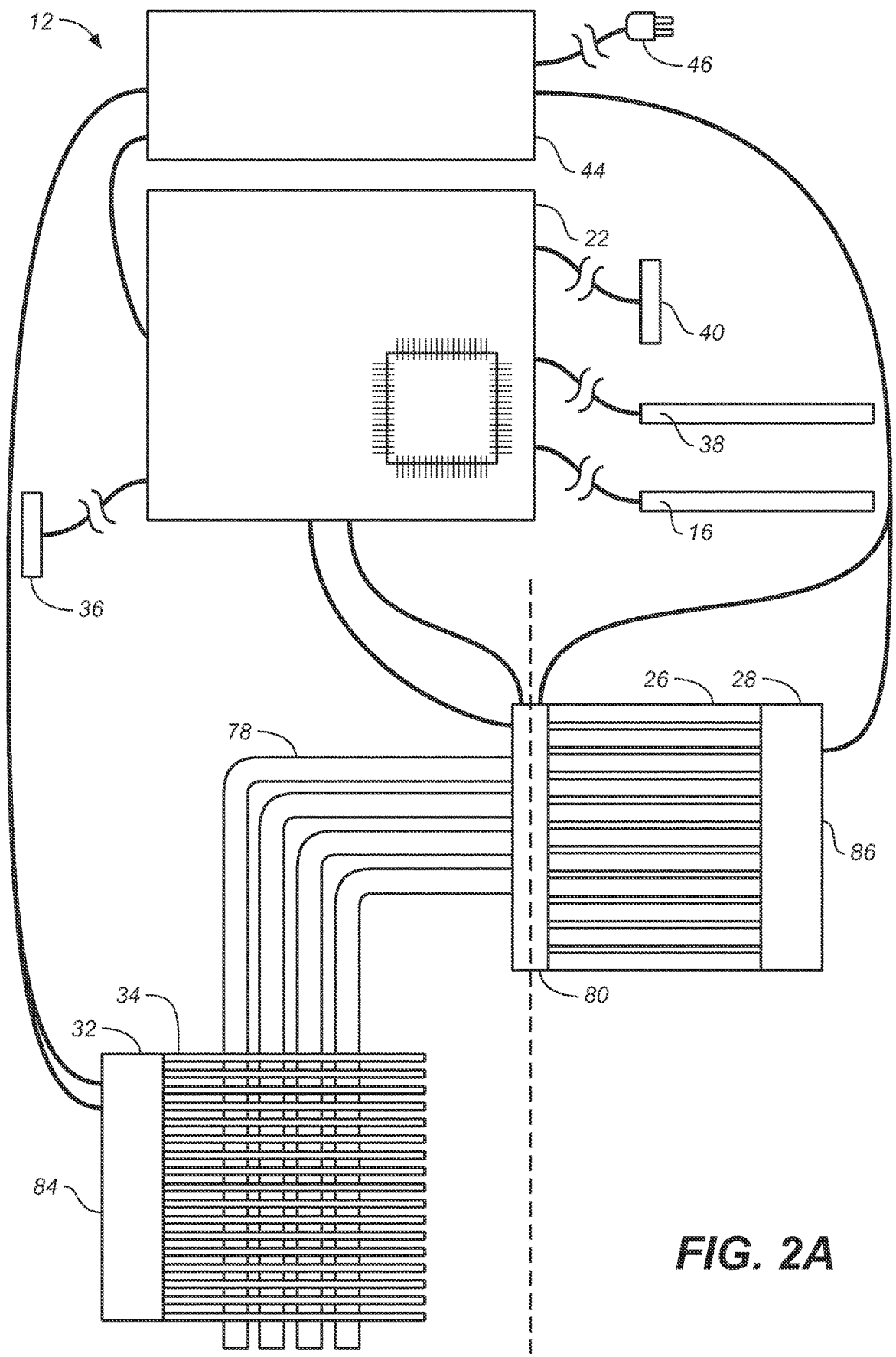
FIG. 2A is a systematic view of the principal elements of a portable apparatus 12 to control the temperature of a variety of embodiments of a small, closed environment.
Figure 2B:
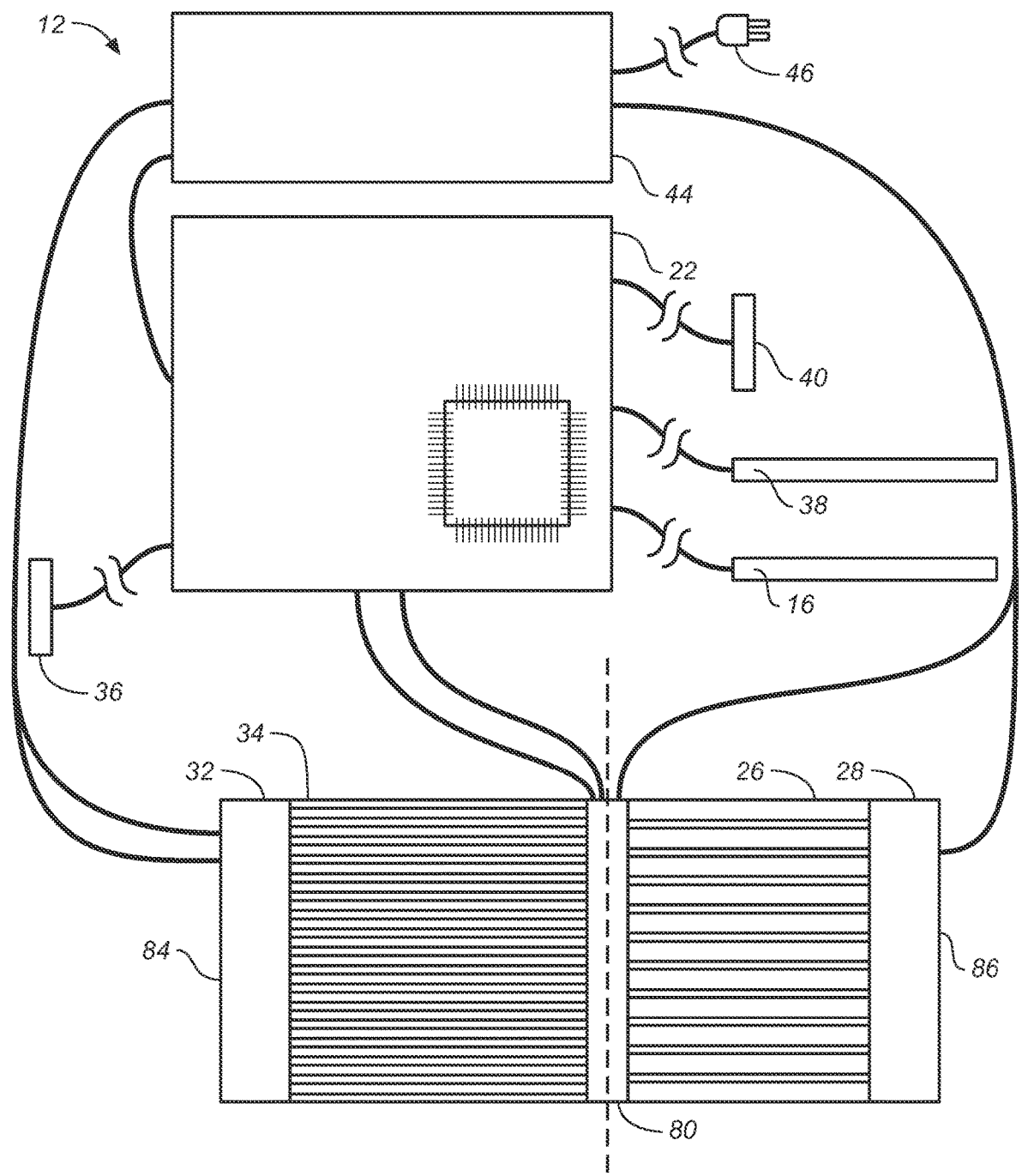
FIG. 2B is a systematic view of the principal elements of a portable apparatus 12 to control the temperature of a variety of embodiments of a small, closed environment without the sealed vacuum copper tubes 78.
Figure 3:
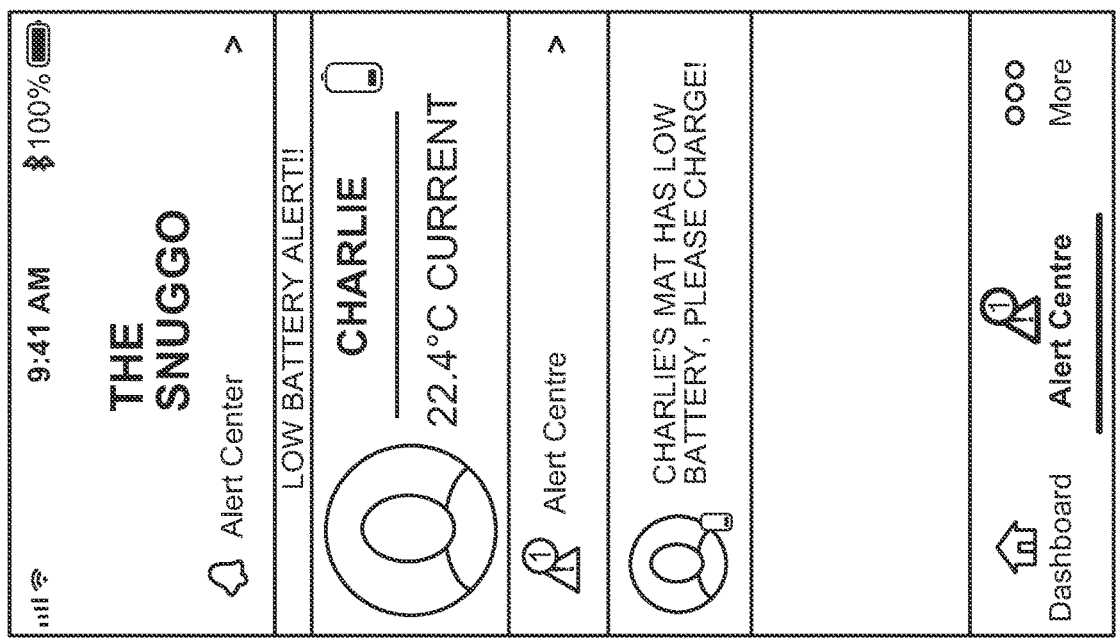
FIG. 3 is a screen shot of a separate digital device communicating with at least one embodiment of a small, closed environment 10 of FIG. 1 depicting an exemplary "LOW BATTERY ALERT!!" message for the system controlling the temperature of the at least one embodiment of a small, closed environment 10 on the system Alert Center menu of displayed system alerts and a current controlled temperature of the small, closed environment of 22.4 degrees Celsius.

Embodiments of the assembled integrated infant environmental mat 10, the integrated environmental pet mat 210, and the integrated environmental footmuff 310 include portable heating/cooling apparatus 12 to control the temperature of a small, closed environment FIGS. 2A and 2B. The heating/cooling apparatus 12 provides at least one microprocessor 22, FIGS. 2A and 2B, including at least one printed circuit board, wireless or Bluetooth connectivity, input and output programmable digital control function, and digital memory storage. The at least one microprocessor 22 is electrically connected to the at least one rechargeable power supply 44. The at least one microprocessor 22 microprocessor performs at least these functions: a) processing a real-time temperature control algorithm; b) receiving real time input from all system sensors; c) providing real time output to heating/cooling apparatus; d) processing a real time communication algorithm; e) processing real time temperature and alert alarm set point(s) and related system control algorithms; f) providing Bluetooth or other wireless communications program interface with external digital device(s); and g) providing Bluetooth proximity positioning sensor input/output to external digital device(s).

At least one superheating pad 16 is electrically connected to the at least one rechargeable power supply 44 and communicates with the at least one microprocessor 22, FIGS. 2A and 2B. The at least one superheating pad 16 provides a fiber-based top layer stitched to a fiber-based bottom layer with an array of electrical heating elements disposed between the layers, FIG. 14. The at least one superheating pad 16 is flexible to conform to planar, concave, or convex surfaces, FIGS. 8, 10, 12,16 and 17.

At least one temperature sensor 24, FIGS. 2A and 2B, reading the temperature of the small, closed environment to be controlled is electrically connected to at least one rechargeable power supply 44 and communicates with the at least one microprocessor 22. At least one temperature sensor 36, FIGS. 2A and 2B, reading the ambient air temperature outside the small, closed environment is electrically connected to at least one rechargeable power supply 44 and communicates with the at least one microprocessor 22.

Figure 8:
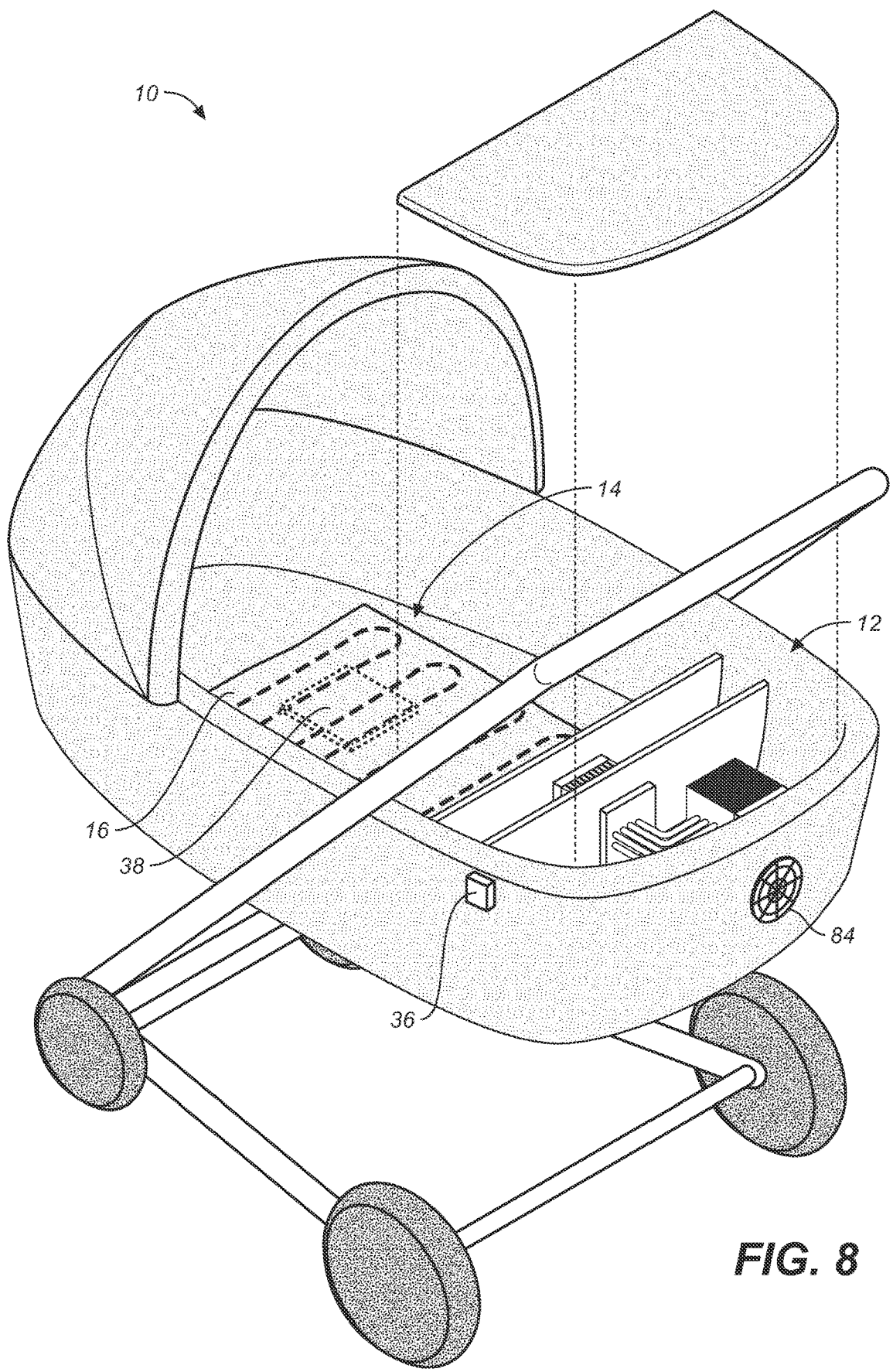
FIG. 8 is a top, left perspective view of an embodiment of the integrated environmental infant pram 10, with the heating/cooling apparatus 12 of FIG. 2A housed in an enclosed end of the pram.
Figure 10:
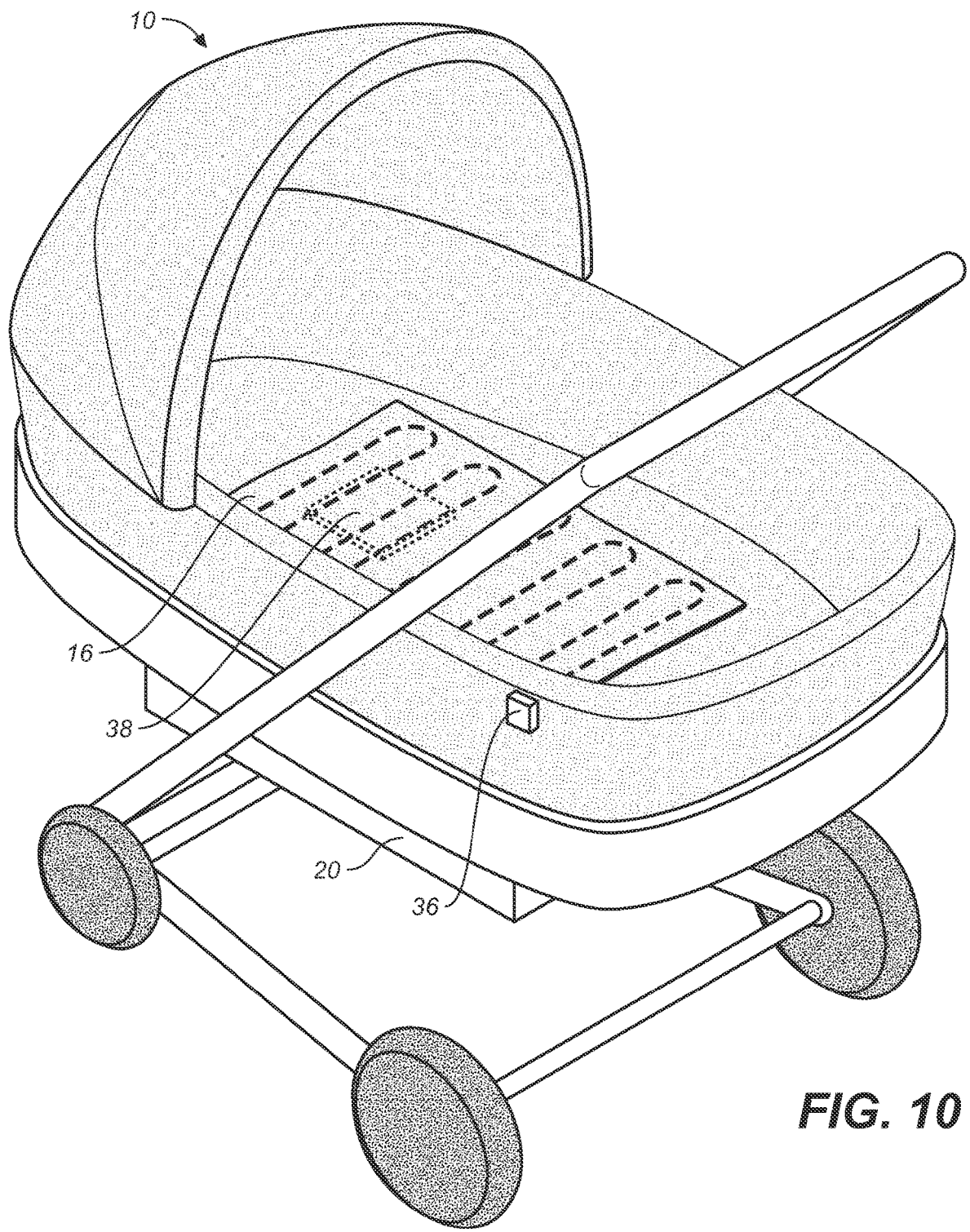
FIG. 10 is a is a top, left perspective view of an embodiment of the integrated environmental infant pram 10, with the control box housing the heating/cooling apparatus 12 releasably attached to the underside of the pram.
Figure 12:
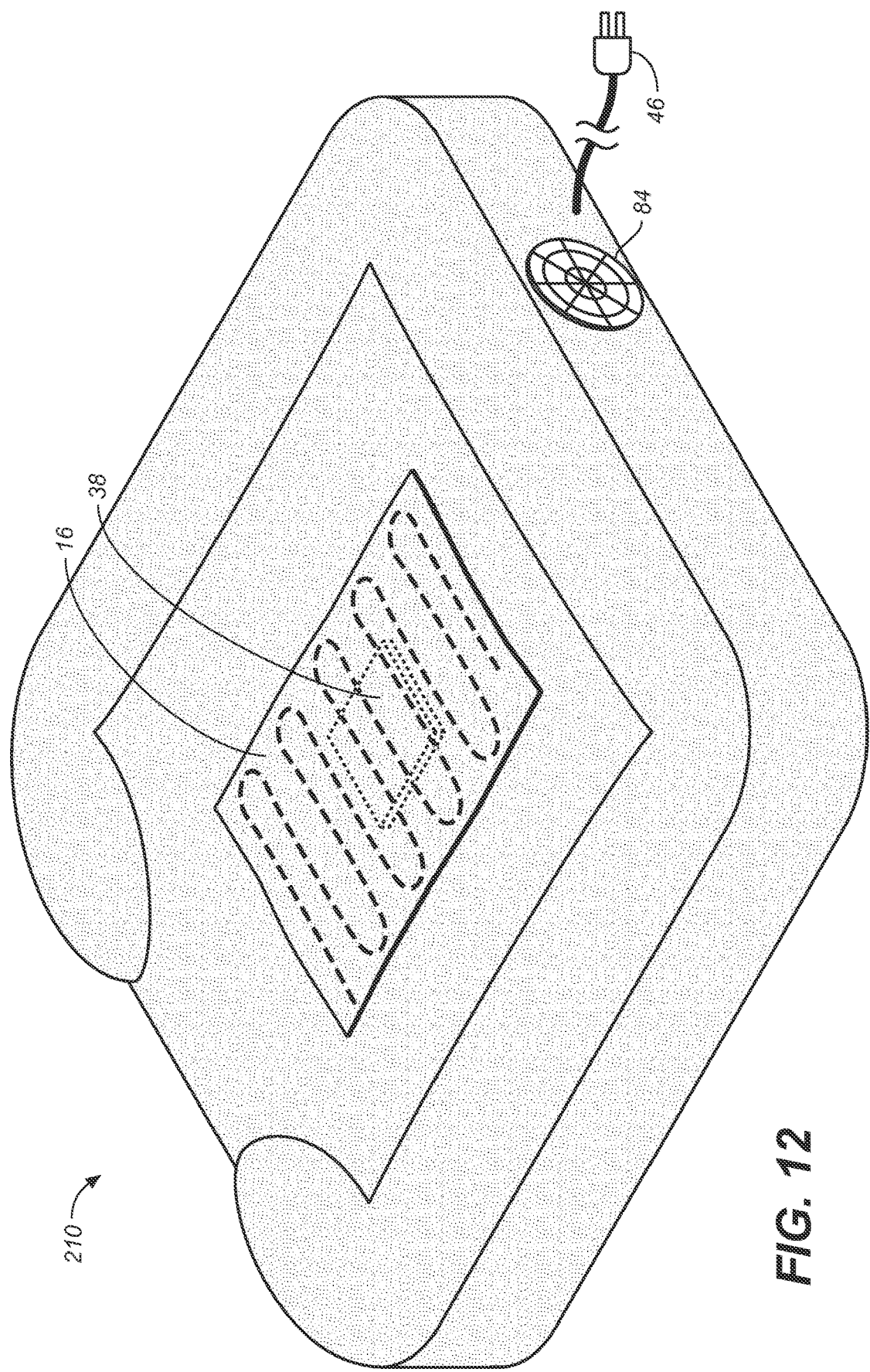
FIG. 12 is a top, left perspective view of an embodiment of the integrated environmental pet mat 210.
Figure 16:
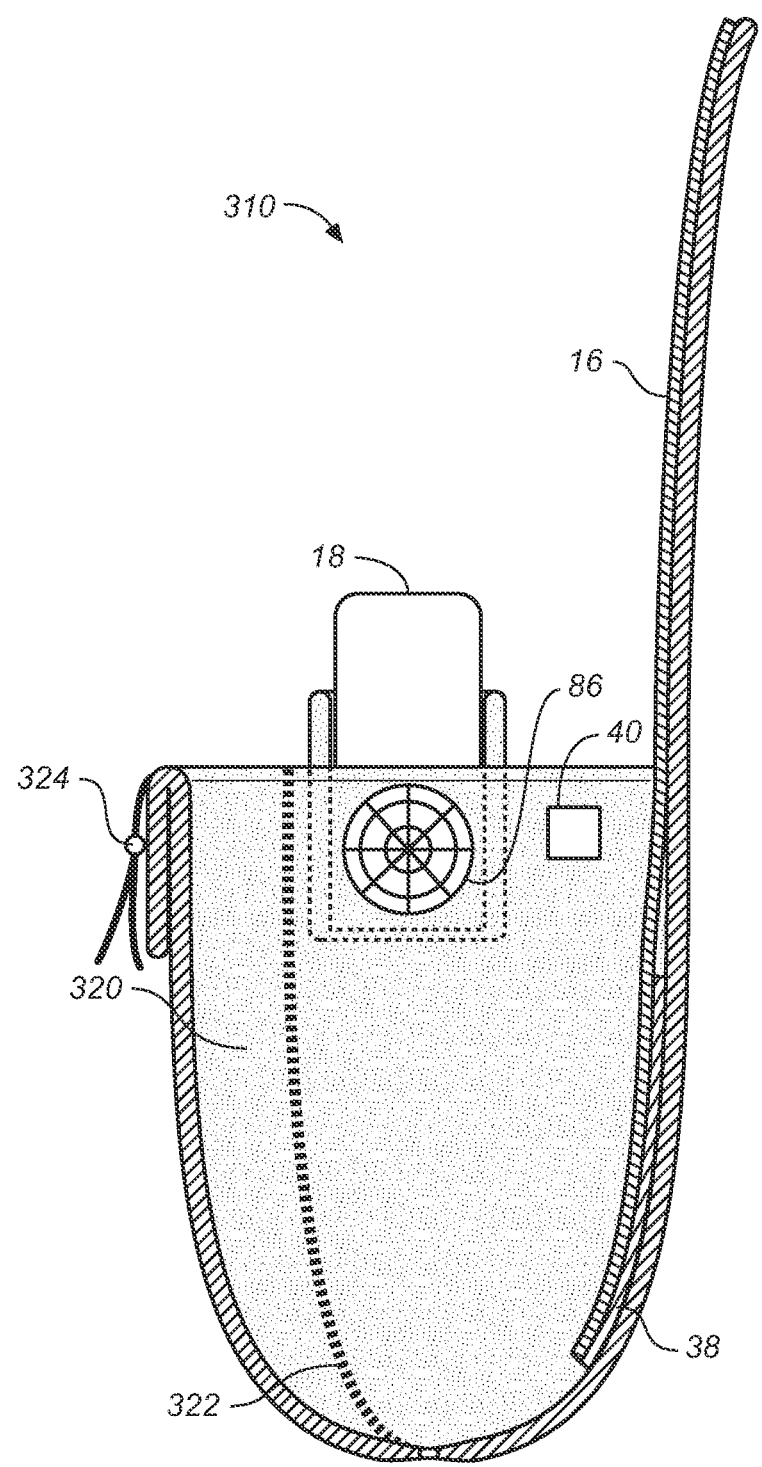
FIG. 16 is a sectional view of FIG. 15 without the infant taken at "16-16."

At least one pressure sensor 38, FIGS. 2A and 2B, embedded in the at least one superheating pad 16, FIGS. 8, 10 and 12, or near the bottom back and embodiment of the integrated environmental footmuff 310, FIGS. 16 and 17, is electrically connected to at least one rechargeable power supply 44 and communicates with the at least one microprocessor 22.

Figure 11:
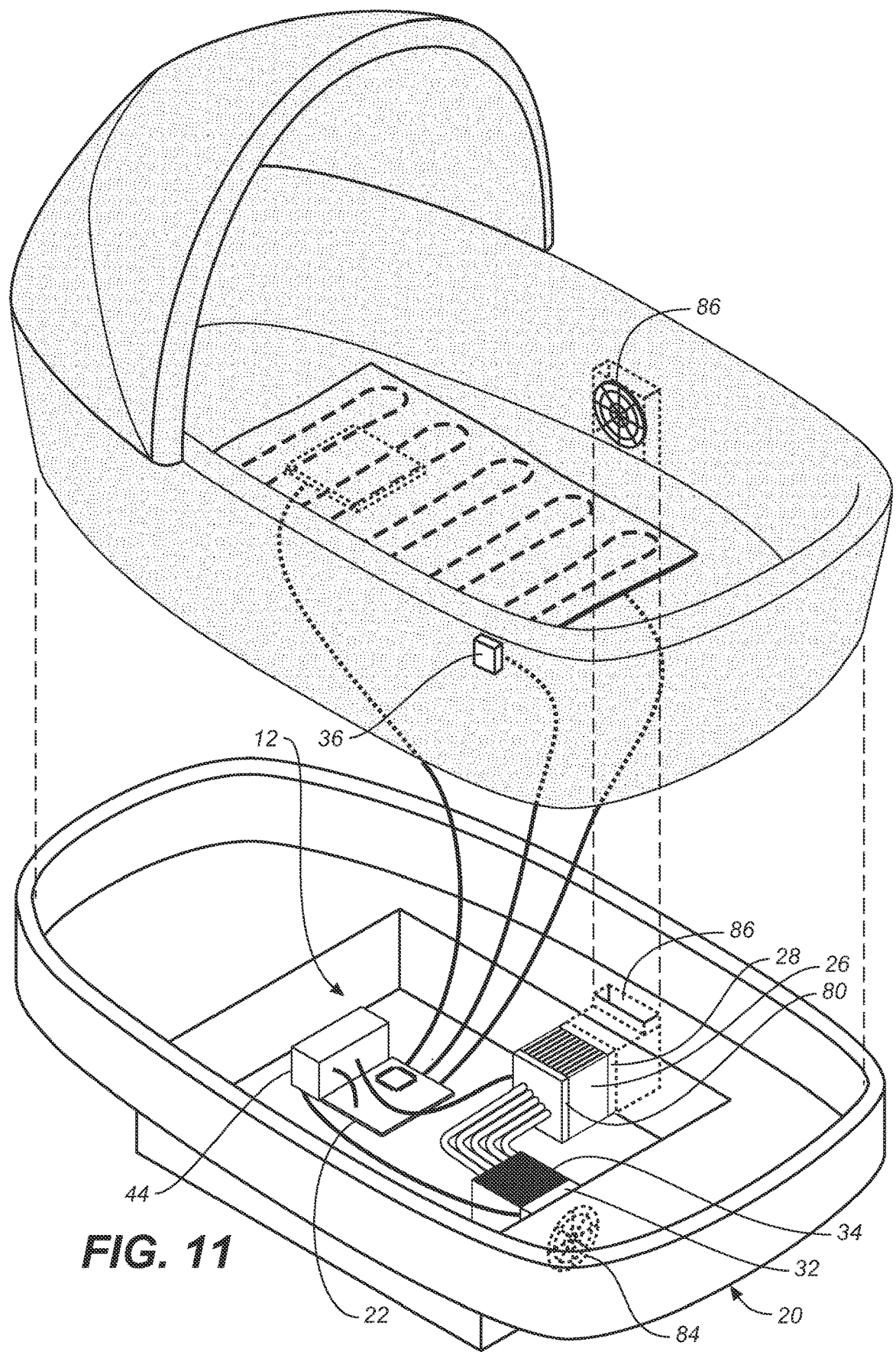
FIG. 11 is an exploded view of FIG. 10.
Figure 13:
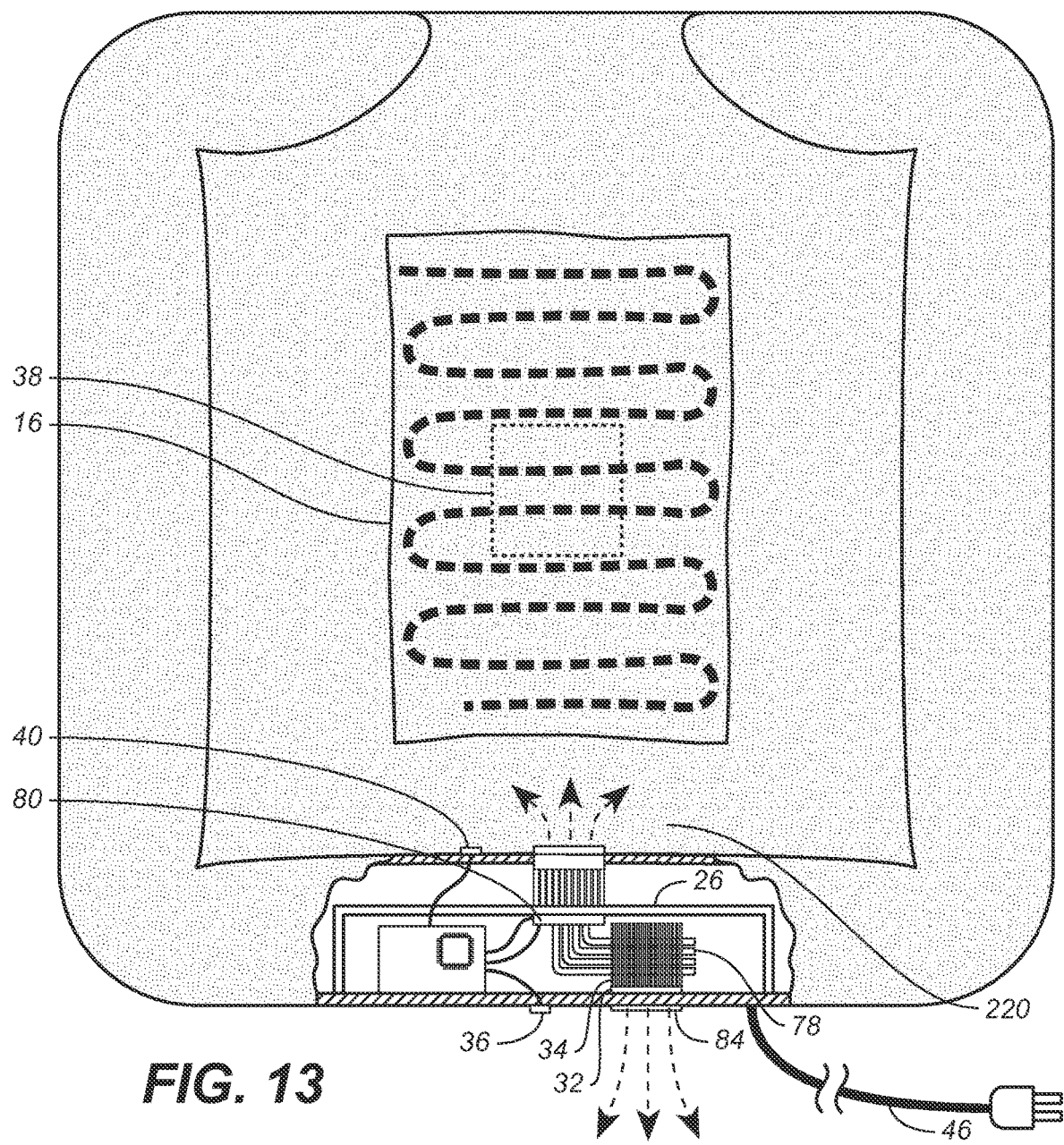
FIG. 13 is a top planar view of FIG. 12 with a portion of the mat top surface removed to reveal elements of the heating/cooling apparatus 12 of FIG. 2A.
Figure 14:
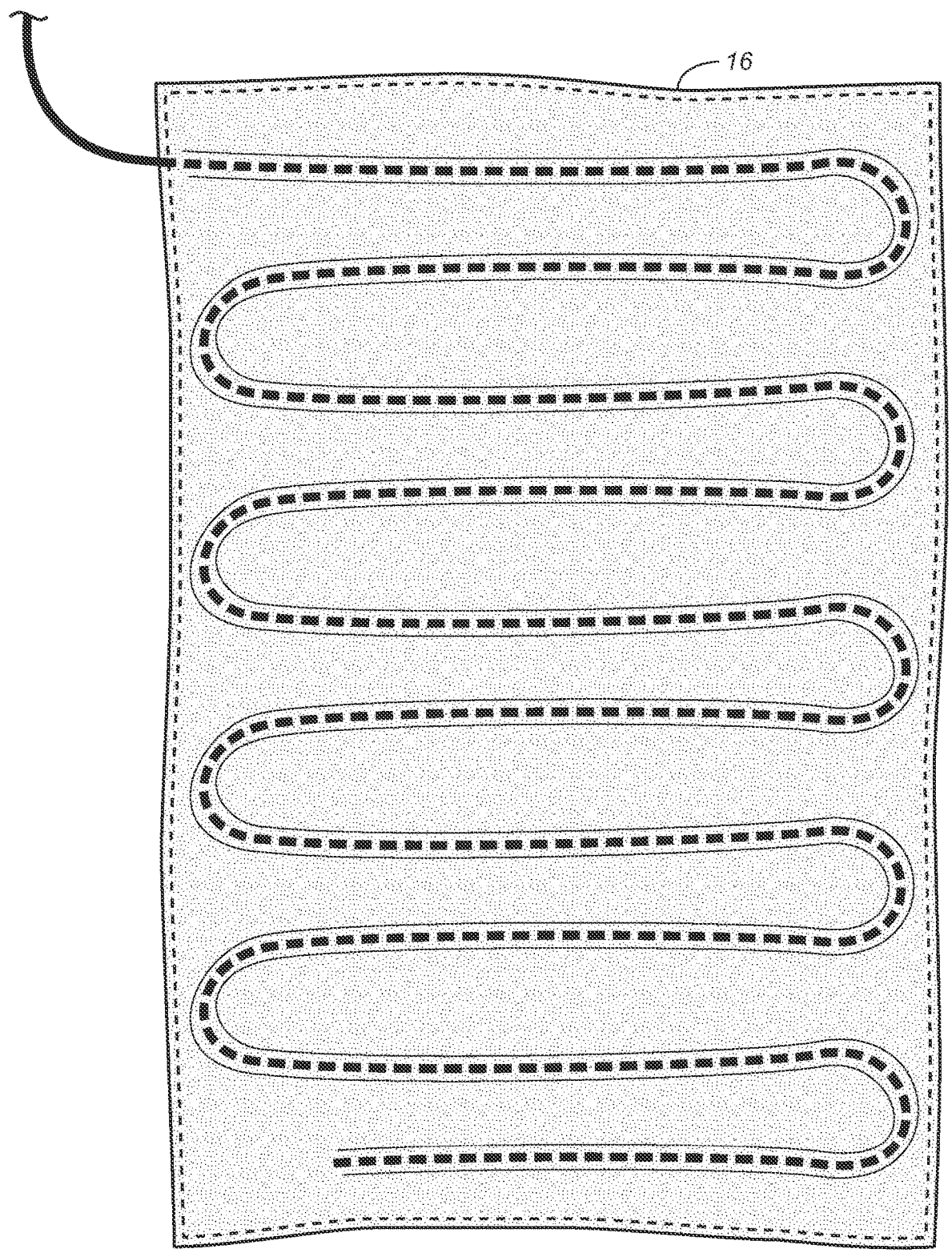
FIG. 14 is a top planar view of the super heating element 16 for embodiments of the integrated environmental infant pram 10, the integrated environmental pet mat 210, and the integrated environmental infant footmuff 10.

At least one first heat sink assembly 26, FIGS. 2A and 2B, functioning as a system temperature diffuser, provides a system temperature distribution fan 28 directing the flow of air from the at least one first heat sink 26 through a portal 86 into the small, closed environment, FIGS. 11, 13 and 16. The system temperature distribution fan 28 is electrically connected to at least one rechargeable power supply 44 and communicates with the at least one microprocessor 22. The system temperature distribution fan 28 directs heated or chilled air from the first heat sink assembly 26 into the respective small, closed environment, FIGS. 9B, 11, and 13.

At least one Peltier plate 80, such as the ILS-TES1-4903 20×20 mm, 5V thermoelectric cooler semiconductor Peltier module, is connected to the at least one first heat sink 26 and is electrically connected to at least one rechargeable power supply 44, and communicates with the at least one microprocessor 22, FIGS. 2A and 2B. For temperature control circuit 1 120, FIG. 7B, the system for integrated environmental infant pram 10, the integrated environmental pet mat 210, and the integrated environmental footmuff 310 controls the cooling effect of the Peltier plate on the at least one first heat sink assembly 26 and the respective small, closed environment temperature is cooled to and maintained at the desired set point by the flow of chilled air from the system temperature distribution fan 28, FIG. 4.

Figure 9A:
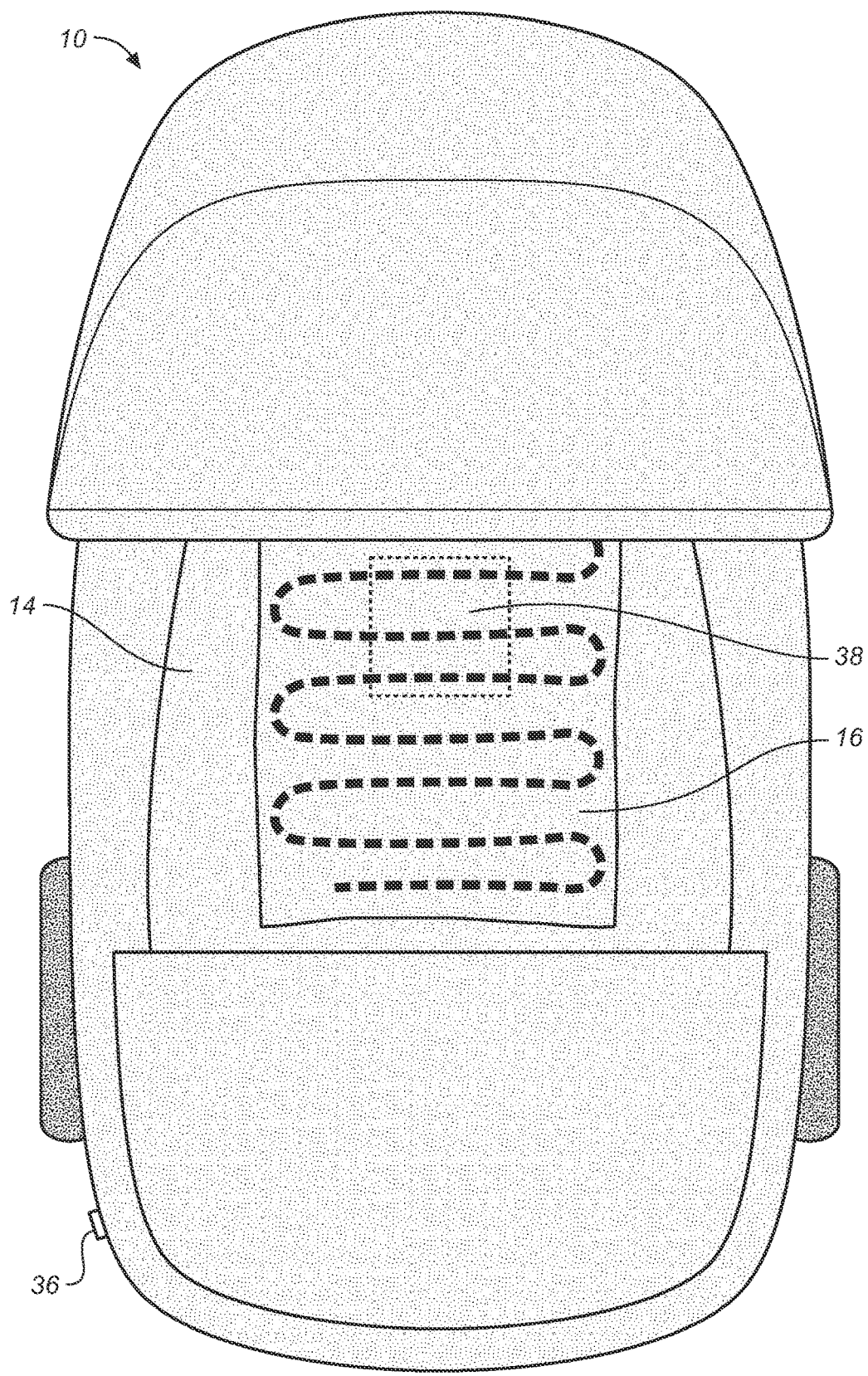
FIG. 9A is a top planar view of FIG. 8, with the cover over the heating/cooling apparatus 12, and the top of the small, enclosed environment 14 open.
Figure 9B:
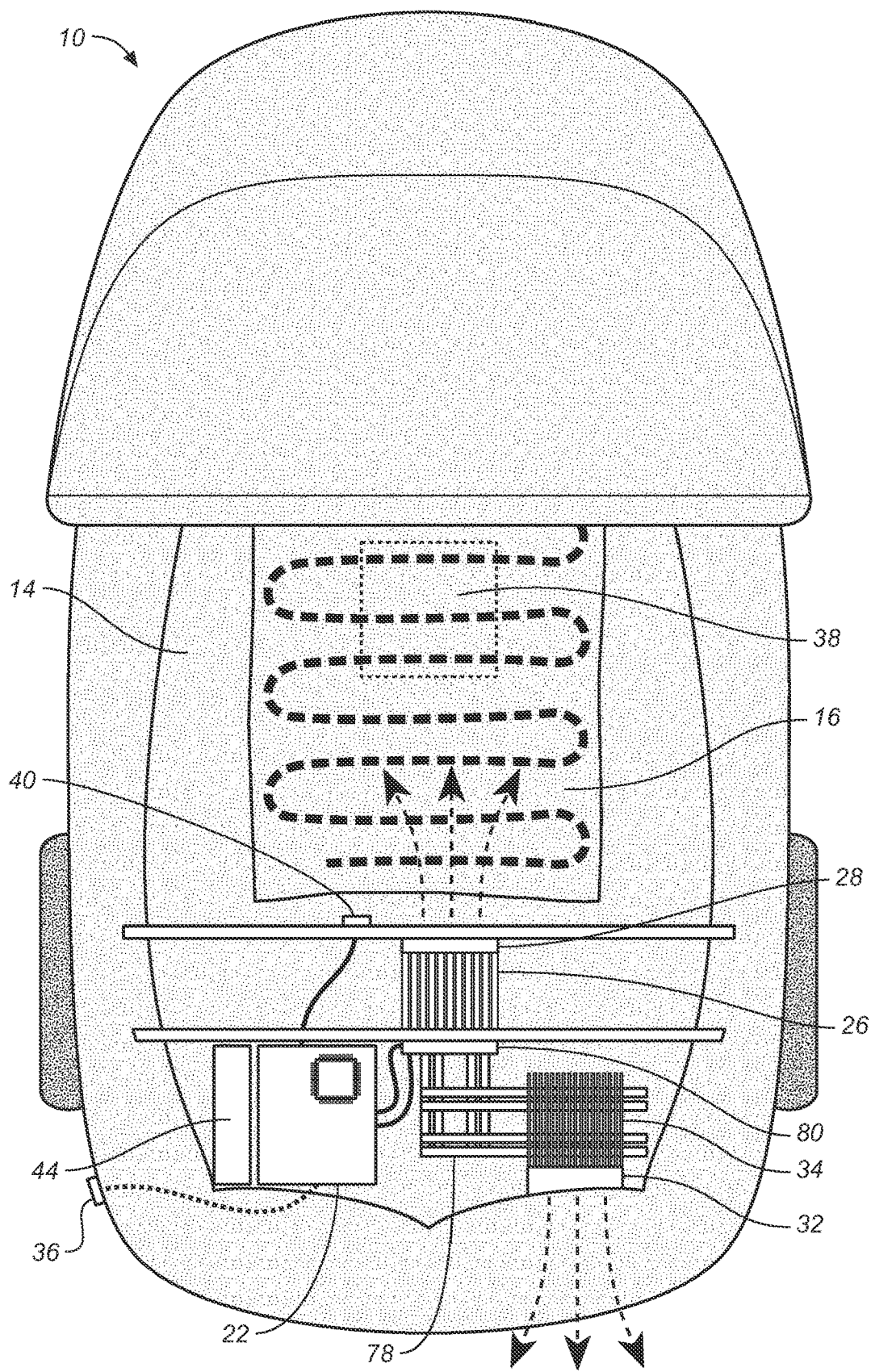
FIG. 9B is a top planar view of FIG. 8, with the cover removed over the heating/cooling apparatus 12 removed.

At least one second heat sink assembly 34 includes at least one system exhaust fan 32, FIGS. 2A and 2B, directing the flow of heated air from the at least one second heat sink assembly 34 through an exhaust portal 84 from the portable apparatus to eliminate heat build-up within the separate enclosed portion housing the portable apparatus, FIGS. 9B and 13. The at least one system exhaust fan 32 is electrically connected to at least one rechargeable power supply 44 and communicates with the at least one microprocessor 22.

At least one rechargeable battery power supply 44 is connected to and provides electrical power for the at least one microprocessor 22, the at least one superheating pad 16, the at least one temperature sensor reading the temperature of the small closed environment 24, the at least one temperature sensor reading the ambient air temperature outside the small closed environment 36, the at least one pressure sensor 38, the at least one system temperature distribution fan 28, the at least one Peltier plate 80, and the at least one system exhaust fan 32, FIGS. 2A and 2B. The at least one rechargeable battery power supply 44 provides a charging/direct current connection 46.

Embodiments of the portable apparatus 12 to control the temperature of a small, closed environment includes a small, closed space to hold an infant in a pram, FIGS. 8-11. For at least one of these pram environment embodiments, FIGS. 2A, 10 and 11, the at least one microprocessor 22, the at least one first heat sink assembly 26, the vacuum copper tubes 78, the at least one Peltier plate 80, the at least one second heat sink assembly 34, and the at least one rechargeable battery power supply 44 providing a charging/direct current connection 46 are housed in a control box 20 releasably affixed to an underside of the pram, the underside of the pram. This pram environment embodiment further provides (i) at least one portal into the small closed environment for connecting the at least one superheating pad 16, the at least one temperature sensor reading the temperature of the small closed environment, and the at least one pressure sensor 38 to the at least one microprocessor and the at least one power supply, and (ii) at least one portal 86 into the small closed environment for receiving the flow of conditioned air from the at least one first heat sink assembly 26. The control box 20 includes at least one portal for the exhaust of heated air similar to the portal 84 depicted in FIG. 8 for another embodiment of the portable apparatus 12 to control the temperature of a small, closed space to hold an infant in a pram, and (ii) at least one portal for connecting the at least one temperature sensor reading the ambient air temperature outside the control box and the pram 36. The bottom surface of the small, closed environment comprises the at least one superheating pad 16 and the at least one pressure sensor 38.

For at least one other of these pram environment embodiments, FIGS. 2A, 8 and 9, the at least one microprocessor 22, the at least one first heat sink assembly 26, the sealed vacuum copper tubes 78, the at least one Peltier plate 80, the at least one second heat sink assembly 34, and the at least one rechargeable battery power supply 44 providing a charging/direct current connection 46 in an enclosed end of the pram, the enclosed end of the pram comprising (i) at least one portal from the enclosed end of the pram into the small closed environment for connecting the at least one superheating pad 16, the at least one temperature sensor reading the temperature of the small closed environment 24, and the at least one pressure sensor 38 to the at least one microprocessor 22 and the at least one rechargeable battery power supply 44, (ii) at least one portal 86 from the enclosed end of the pram into the small closed environment for receiving the flow of conditioned air from the at least one first heat sink assembly 26, (iii) at least one portal from the enclosed end of the pram to the exterior ambient air environment on the outside of the pram for the exhaust of heated air from enclosed end of the pram 84, and (iv) at least one portal from the enclosed end of the pram for connecting the at least one temperature sensor reading the ambient air temperature outside the small closed environment and pram 36. The bottom surface of the small, closed environment comprises the at least one superheating pad 16 and the at least one pressure sensor 38. The top cover for the small, closed environment of the pram can be a blanket, the extended pram cover, or a separate fitted piece to house the infant's body within the pram all provided by the user depending on the weather and the user's desired dynamics with the infant while the pram is in use (not shown).

Figure 15:
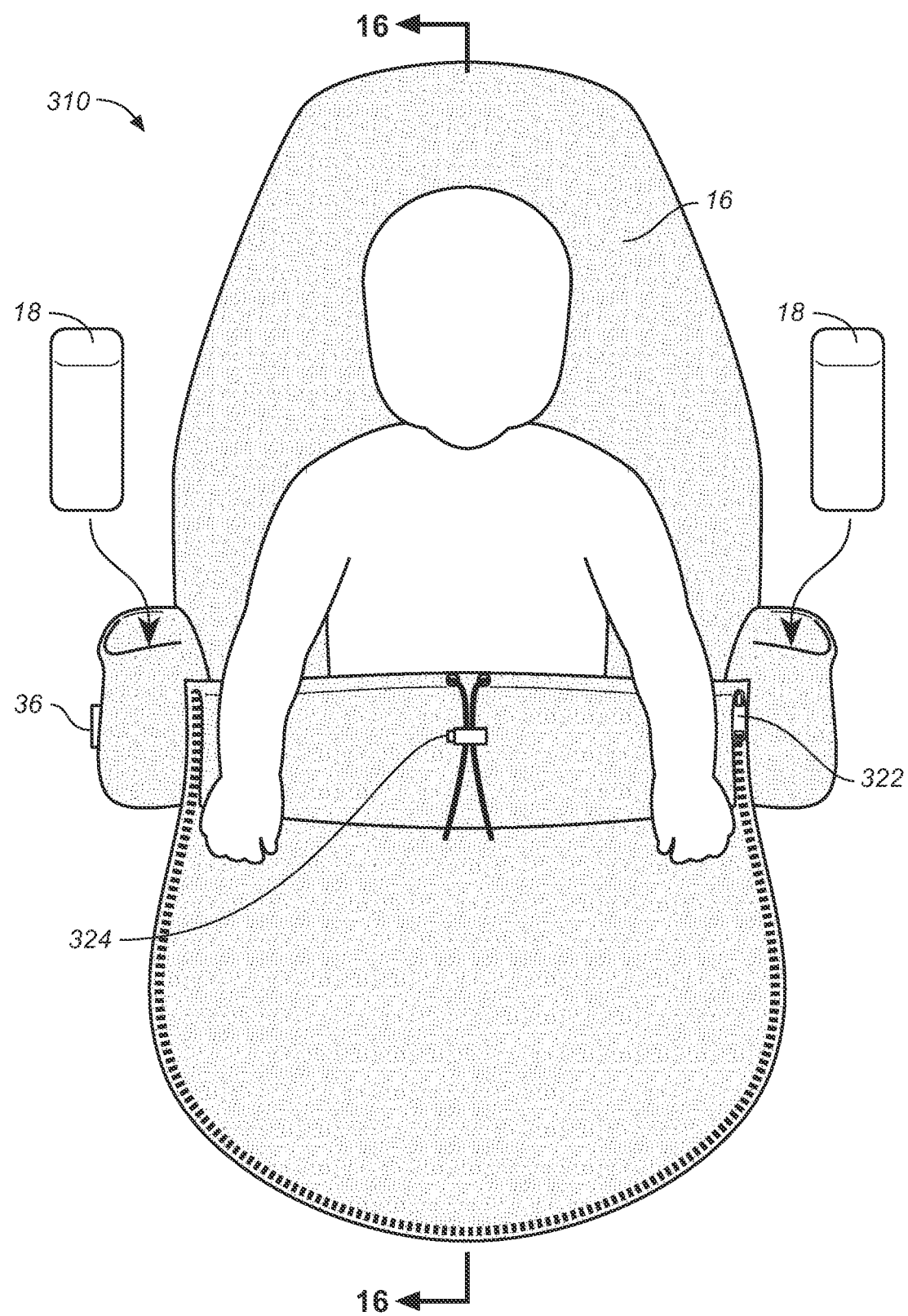
FIG. 15 is a front planar view of an embodiment of integrated environmental infant footmuff 310, depicting an infant.

For at least one embodiment of the portable apparatus to control the temperature of a small, closed environment, the small, closed environment 320 includes a space to house the legs and lower torso of an infant in a footmuff 310, FIGS. 2B, 15-17. For the at least one embodiment of the portable apparatus including a footmuff 310, the at least one microprocessor 22, the at least one first heat sink assembly 26, the at least one second heat sink assembly 34, and the at least one rechargeable battery power supply 44 providing a charging/direct current connection 46 are housed in at least one control box 18 releasably received into a pocket on a side of the footmuff, the pocket on the side of a footmuff comprising (i) at least one portal into the small closed environment 320 for connecting the at least one superheating pad, the at least one temperature sensor reading the temperature of the small closed environment 320, and the at least one pressure sensor to the at least one microprocessor and the at least one power supply, (ii) at least one portal 86 into the small closed environment 320 for receiving the flow of conditioned air from the at least one first heat sink assembly 26, and (iii) at least one portal for the exhaust of heated air from the control box 20 into the ambient air outside of the footmuff. The control box further includes at least one portal for connecting the at least one temperature sensor reading the ambient air temperature outside the footmuff 36. An internal top surface of the footmuff surface comprises the at least one superheating pad 16 and the at least one pressure sensor 38. A zippered closure 322 connects the front and back of the footmuff 310 small, closed environment, FIGS. 15 and 16. A drawstring 324 secures the top portion of the footmuff 310 small, closed environment 320, FIGS. 15 and 16, provides closure of the small, closed environment 320 around the torso of an infant in the footmuff.

At least one embodiment of the portable apparatus to control the temperature of a small closed environment provides a small closed environment 220 including an array of ducts between a bottom layer and a top surface layer of a pet bed 210, FIGS. 2A, 12 and 13. For the at least one pet bed embodiment, the at least one microprocessor 22, the at least one first heat sink assembly 26, the sealed vacuum copper tubes 78, the at least one Peltier plate 80, the at least one second heat sink assembly 34, and the at least one rechargeable battery power supply 44 providing a charging/direct current connection 46 are housed in a separate enclosed portion of the small closed environment 220, the separate enclosed portion of the small closed environment of the comprising (i) at least one portal from the separate enclosed portion into the small closed environment 220 for connecting the at least one superheating pad 16, the at least one temperature sensor reading the temperature of the small closed environment 24, and the at least one pressure sensor 38 to the at least one microprocessor 22 and the at least one rechargeable battery power supply 44, (ii) at least one portal from the separate enclosed portion into the small closed environment 220 for receiving the flow of conditioned air from the at least one first heat sink assembly 26, (iii) at least one exhaust portal 84 from the separate enclosed portion to the exterior ambient air environment on the outside of the pet bed for the exhaust of heated air from separate enclosed portion. The top surface layer of the pet bed comprises the at least one superheating pad 16 and the at least one pressure sensor 38.

At least one embodiment of a system to control the temperature of a small closed environment 14, 220, or 320, includes at least one separate handheld digital device 90 comprising wireless or Bluetooth connectivity with the at least one microprocessor 22, FIGS. 1, 9A, 13 and 16. Temperature control software resident in the at least one separate handheld digital device 90 and the at least one microprocessor 22 provides discrete heating and cooling control circuits to the small closed environments based upon set points, real time system environmental dynamics, and alert warnings, FIGS. 3-7B. Temperature control firmware in the at least one microprocessor 22 provides discrete heating and cooling control circuits to the small closed environment based upon set points, real time system environmental dynamics, and alert warnings, FIGS. 3-7B.

The at least one embodiment of a system to control the temperature of a small, closed environment 14, 220, or 320 will sit idle unless one of these events occur: 1) the at least one pressure sensor 38 detects weight of an infant or pet; 2) the physical button to activate the system is switched on; or 3) a user turns the system on via application software on at least one remote handheld digital device 90 communication via wireless or Bluetooth connectivity to the system.

Figure 4:
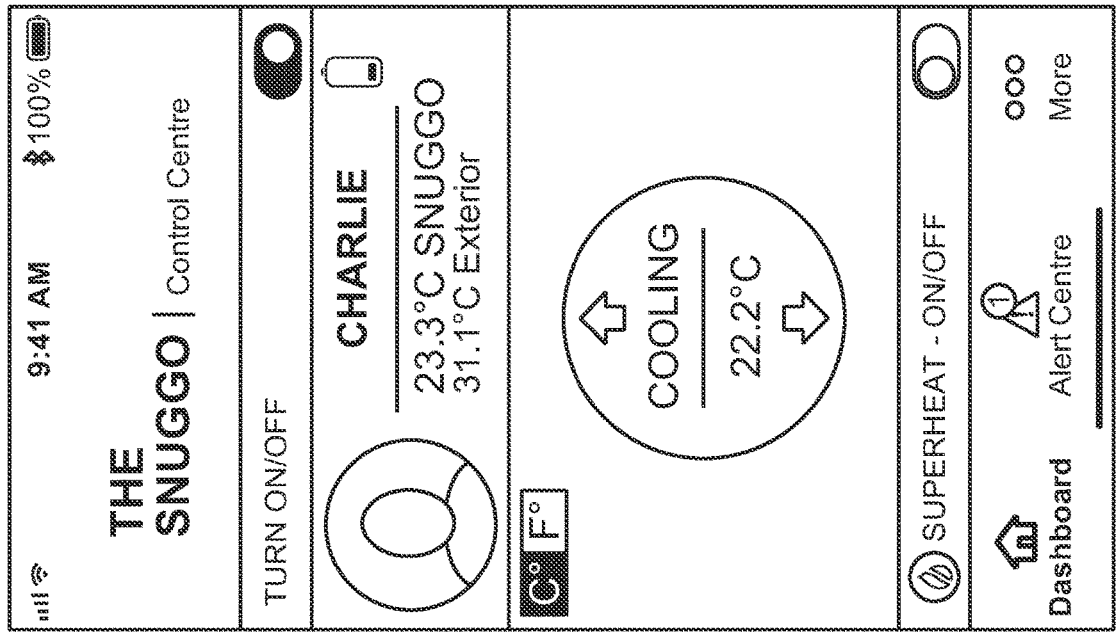
FIG. 4 is a screen shot of a separate digital device of FIG. 1 communicating with at least one embodiment of a small closed environment 10 of FIG. 1, depicting engagement of the cooling circuit and a current controlled temperature of the small closed environment 10 of 23.3 degrees C., the set point for the small closed environment 10 of 22.2 degrees C., the current external ambient air temperature of 31.1 degrees C., and a notification of one Alert Center message Dashboard Control Center menu of system displays.
Figure 6:
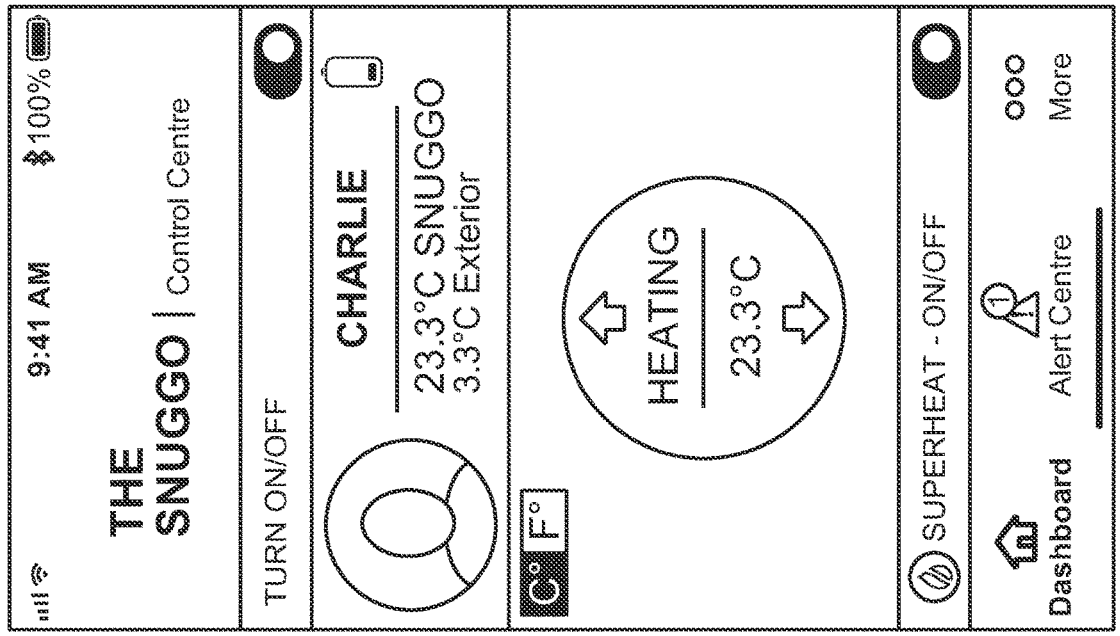
FIG. 6 is a screen shot of a separate digital device communicating with at least one embodiment of a small closed environment 10 of FIG. 1, depicting engagement of the heating circuit and a current controlled temperature of the small closed environment 10 of 23.3 degrees C., the set point for the small closed environment 10 of 23.3 degrees C., the current external ambient air temperature of 3.3 degrees C., and notification of superheat element on and one Alert Center message Dashboard Control Center menu of system displays.
Figure 5:
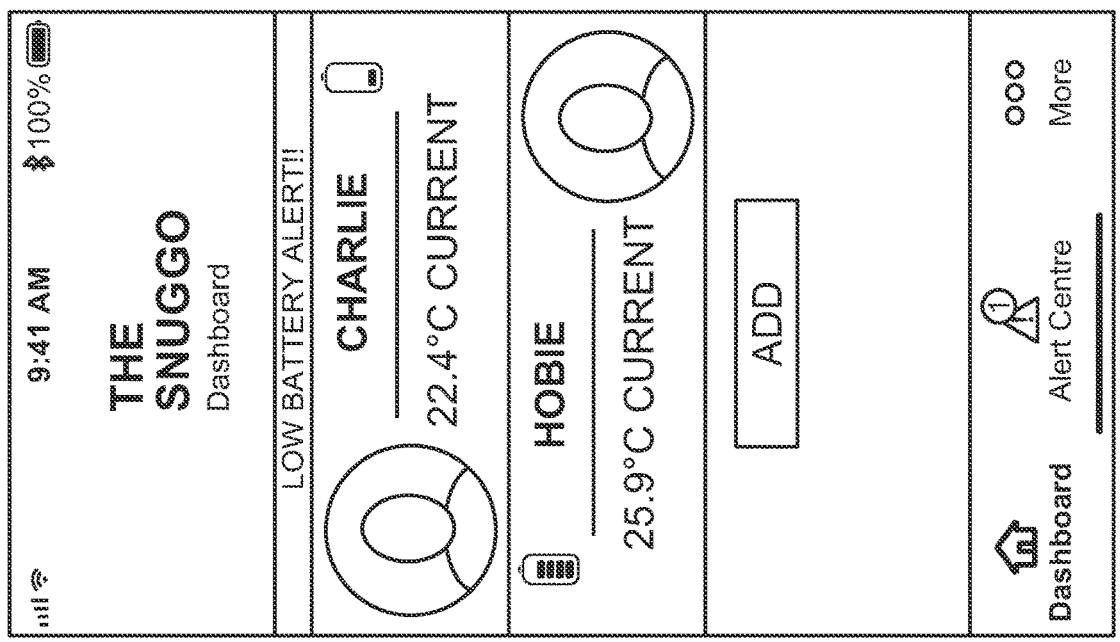
FIG. 5 is a screen shot of a separate digital device communicating with two embodiments of a small closed environment, 10 and 210 of FIG. 1, depicting engagement of the cooling circuit and a current controlled temperature of the small closed environment 10 of 22.4 degrees C., and a current controlled temperature of the small closed environment 210 of 25.9 degrees C., the option to add communication with a third small closed environment, and a notification of one Alert Center message Dashboard Control Center menu of system displays.
Figure 7A:
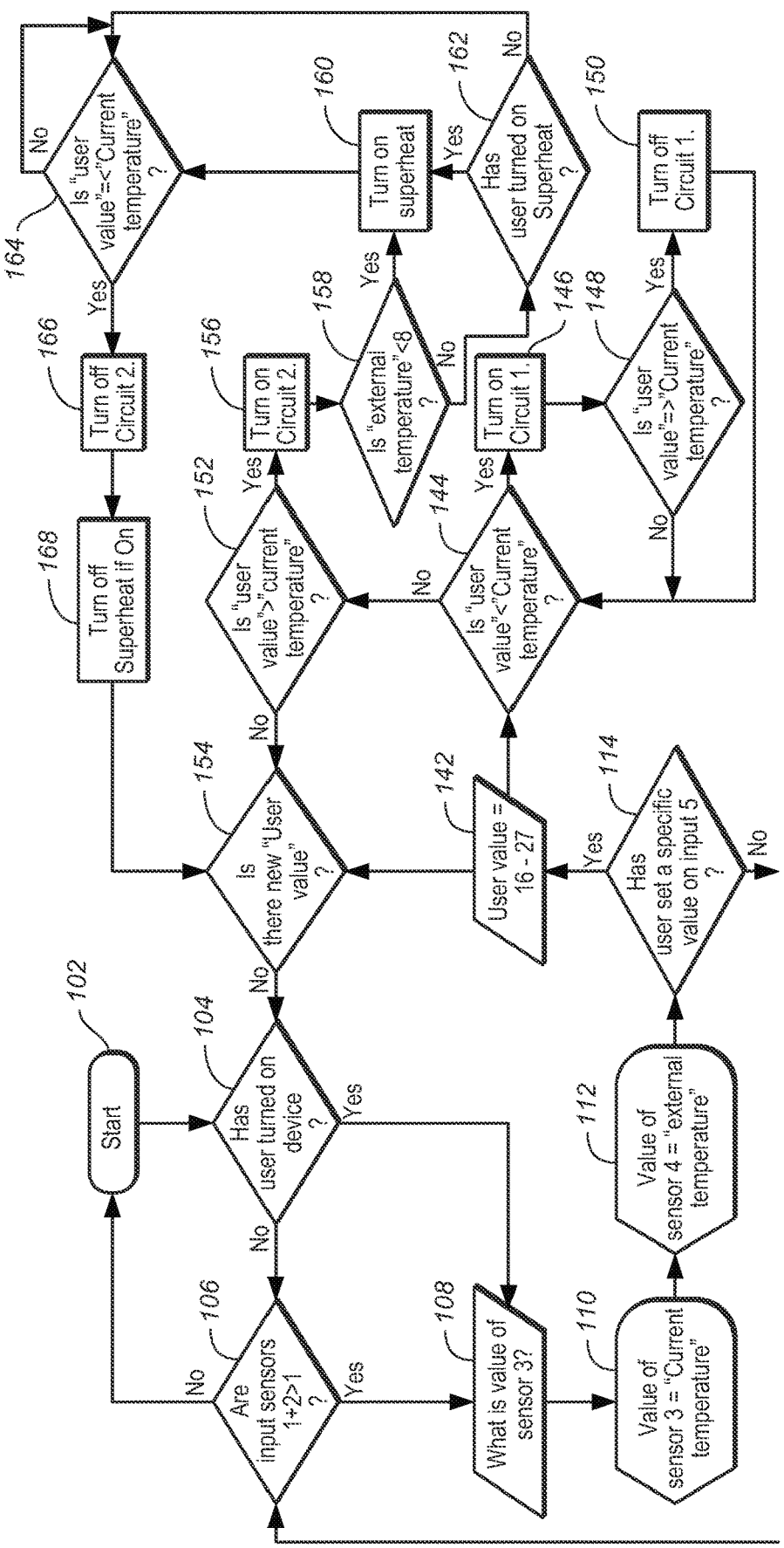
FIG. 7A is a schematic flow diagram for a portion of the methods of heating/cooling temperature control and circuits for embodiments of the integrated environmental infant pram 10, the integrated environmental pet mat 210, and the integrated environmental infant footmuff 310.
Figure 7B:
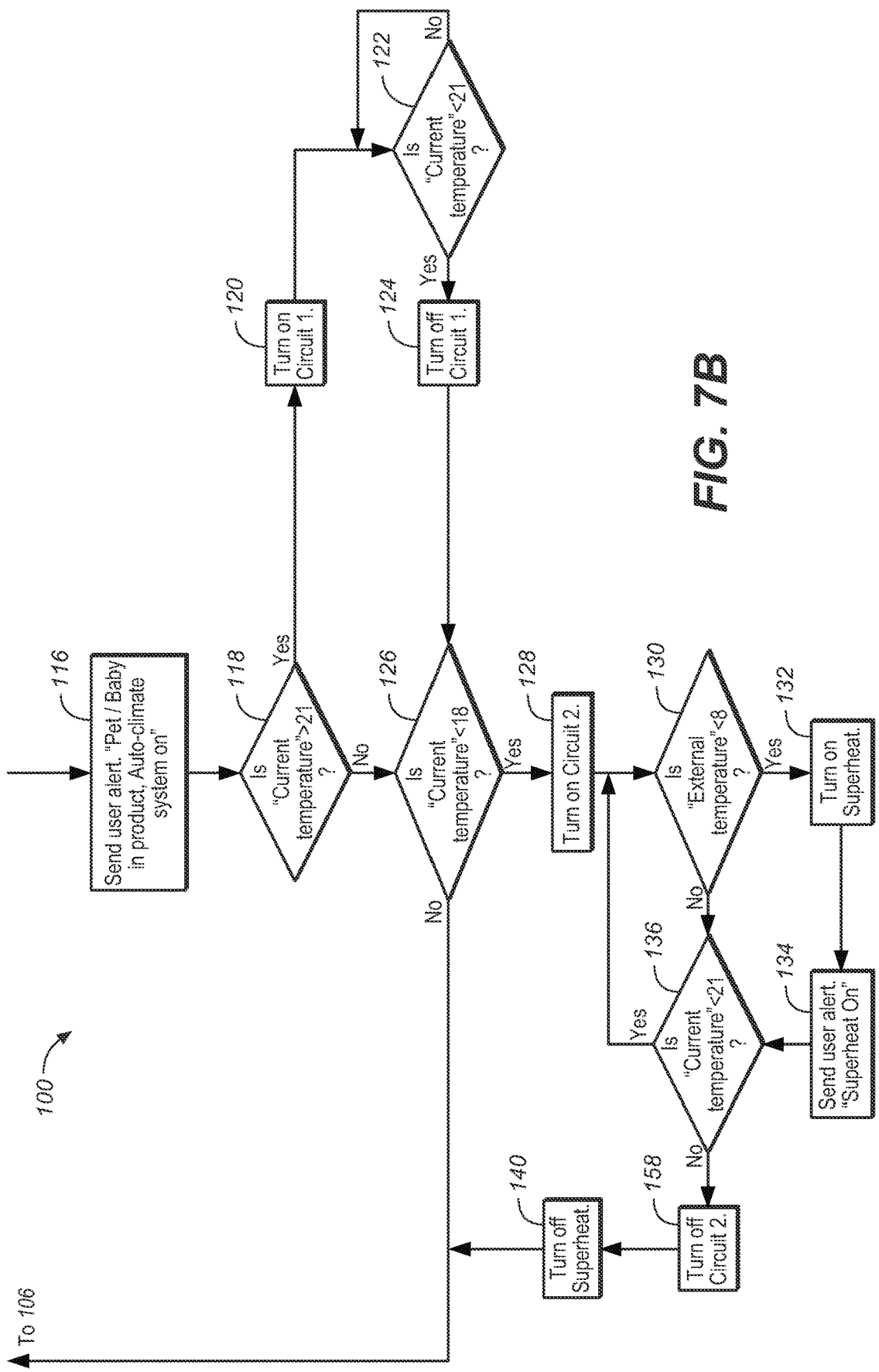
FIG. 7B is a schematic flow diagram for a portion of the methods of heating/cooling temperature control and circuits for embodiments of the integrated environmental infant pram 10, the integrated environmental pet mat 210, and the integrated environmental infant footmuff 310.

Once the system has been turned on and requests the temperature from the at one temperature-controlled environment temperature sensor 40 and the at least one ambient outside air temperature 36, the respective real time temperatures are displayed on the screen of the at least one remote handheld digital device 90, FIG. 4. With no further user input, for controlled environment temperatures above 22.2 degrees Celsius, the microprocessor implemented method 100 for an embodiment of the assembled integrated environmental infant pram 10, or an embodiment of the assembled integrated environmental pet mat 210, or an embodiment of the assembled integrated environmental infant footmuff 310 includes a first circuit (circuit 1) that provides cooling to the small, closed space. The system allows current from the at least one rechargeable battery power supply 44 or a power source connected to the system by the at least one charging/ direct current charging connection 46 to flow through the system electrical circuit turning on the at least one Peltier plate 80. The at least one microprocessor 22 turns one the at least one system exhaust fan 32 and the at least one system distribution fan 28. The fans will stay on as long as the Peltier plate receives current or until 22.2 degrees Celsius is achieved within the controlled environment of the small, enclosed space.

The microprocessor implemented method 100 for embodiments of the assembled integrated environmental infant pram 10, assembled integrated environmental pet mat 210 and assemble integrated environmental infant footmuff 310 includes a second circuit (circuit 2) that provides heating in the event heating must reach a controlled environment temperature of 22.2 degrees Celsius. The system reverses the polarity is reversed for the at least one Peltier plate 80. Once a controlled environment temperature of 22.2 degrees Celsius is reached, the system heating/cooling apparatus powers down into idle mode and switch on again should the temperature inside the active area drop below or rise above 22.2 degrees Celsius in which case the system turns on again as above in the appropriate heating or cooling circuit, FIGS. 7A and 7B.

The user can override the 22.2 degrees Celsius by setting the precise temperature (between 16-27 degrees Celsius) and this effectively replaces the firm ware set point 22.2 degrees Celsius whilst the at least one pressure sensor 38 is active (detects an infant or pet). Once an infant or pet is not present, the system reverts to the firm ware-controlled environment set point of 22.2 degrees Celsius.

In the event of very cold weather the at least one superheating mat will be activated by the system turn on (at outside temperatures below 8 degrees Celsius) and the Peltier plate heating system.

The at least one first and second heat sink assemblies, 26 and 30 respectively, and the sealed vacuum copper tubes 78 help to remove or distribute the air chilled or heated by the heating/cooling apparatus 12, FIG. 2A. One side of the at least one Peltier plate 80 heats up when current is passed through the plate and the opposite side of the at least one Peltier plate 80 gets cold. Thermal heat transfer paste is used to connect both sides of the at least one Peltier 80 to the at least one first heat sink assembly 26. The active side of the at least one heat sink assembly 26 is smaller to intensify the heat or cold transfer by presenting a smaller target area to heat or cool. The air between the fins of the at least one heat sink assembly 26 get very cold or hot and the at least one system temperature distribution fan 28 distributes the hot or cold air into the small, closed environment.

Similarly, the waste heat side of the at least one first heat sink assembly 26 is larger relative to the active side to distribute the heat closer to the ambient outside temperature and keep the waste side cool as to avoid any heat leak into the active side, FIG. 2B. The at least one Peltier plate 80 also works on temperature difference so the cooler waste side of the at least one first heat sink assembly 26 the more efficient cooling is provided to the active side of the at least one first heat sink assembly 26. This dynamic equally applies to the heating circuit as the system keeps the hot side of the at least one Peltier plate below 50 degrees Celsius.

In certain embodiments the heating/cooling apparatus 12 for system that do not provide space for a large waste heat side for the at least one first heat sink assembly 26, FIG. 2A, ends of the sealed vacuum copper tubes 78 are attached to the waste heat side to remove the heat away from the at least one Peltier plate 80. The vacuum copper tubes are filled with a little water. The sealed vacuum copper tubes and water absorb the heat close to the at least one Peltier plate 80. The other ends of the sealed vacuum copper tubes are attached to at least one second heat sink assembly 34 with at least one system exhaust fan 32. Since the temperature of the at least one second heat sink assembly 34 is colder than waste heat side of the at least one first heat sink assembly 26, the sealed vacuum copper tubes are constantly trying to achieve an equilibrium in the temperatures of the at least one first and second heat sink assemblies, 26 and 30 respectively, so the heat flows from away from the waste heat side of the at least one first heat sink assembly 26 to the cooler at least one second heat sink assembly 34. The at least one system exhaust fan 32 continues to remove the transferred heat from the at least one second heat sink assembly 34 ensuring a continuous process of system cooling.

The system demonstrably provides adequate temperature control by the temperature sensors and the dual heating/cooling circuits controlled by the microprocessor and adjusted according to user inputs within a fixed range of temperature. The disclosed system software and firm ware can be modified, however, to maximize heating/cooling efficiencies by collecting operational data to optimize the current to the at least one Peltier plate 80, provide variable fan speeds, and other operational variables.

As disclosed, the embodiments of the assembled integrated infant environmental pram 10, pet mat 210 and footmuff 310 provide a microprocessor implemented method 100 of regulating the temperature of a small, closed environment and includes dual circuits, multiple input sensors, and user defined input temperature variables and set points, and system alerts, FIGS. 3-7B, the method 100 including the steps of:

1. starting the method 102;
2. determining whether the user has turned on the device 104;
3. if the user has not turned on the device, evaluating whether input sensors 1 and 2 are greater than 1 106;
4. if input sensors 1 and 2 are not greater than 1, starting the method 102;
5. if the user has not turned on the device or if input 1 and 2 sensors are greater than 1, evaluating the value of input sensor 3 (the temperature of the environment to be controlled; herein "current temperature") 108;
6. setting the temperature to the value of input sensor 3 110;
7. evaluating the value of input sensor 4 and setting the value of input sensor 4 as the external temperature 112;
8. determining if the user has set a separate value on input sensor 5 114;
9. if the user has not set a separate value on input 5, sending a user alert "pet/infant in product, auto-climate system on" 116;
10. determining if the temperature is greater than 70 degrees Fahrenheit 118;
11. if the user has not set a separate value on input sensor 5, and if the temperature is greater than 70 degrees Fahrenheit, turning on Circuit 1 120;
12. determining if the temperature is less than 70 degrees Fahrenheit while Circuit 1 is turned on 122;
13. if the temperature is less than 70 degrees Fahrenheit, turning Circuit 1 off 124;
14. if the user has not set a separate value on input sensor 5, and if the temperature is not greater than 70 degrees Fahrenheit or if Circuit 1 is turned off, determining if the temperature is less than 65 degrees Fahrenheit 126;
15. if the temperature is less than 65 degrees Fahrenheit, turn on Circuit 2 128;

16. determining if the external temperature is less than 46 degrees Fahrenheit 130;
18. if the external temperature is less than 46 degrees Fahrenheit, turn on superheat 132;
19. send user alert ("Superheat On") 134;
20. check if the temperature less than 70 degrees Fahrenheit 136;
21. if the temperature is not less than 70 degrees Fahrenheit, turn off Circuit 2 138;
22. if the temperature is not less than 70 degrees Fahrenheit, turn off superheat 140;
23. if the user has set a separate value on input 5, determining if the user input value is between 60 degrees Fahrenheit and 80 degrees Fahrenheit 142;
24. if the user has set a separate value on input sensor 5, determining if the user input value is less than the temperature 144;
25. if the user input value is less than the current, turning on Circuit 1 146;
26. determining if the user input value is equal to or greater than the temperature 148;
27. if the user input value is greater than the temperature, turning off Circuit 1 150;
28. determining if the user input value is greater than the temperature 152;
29. if the user input value is not greater than the temperature, determining if the user has entered a new user value 154, and returning to step 104;
30. if the user input value is greater than the temperature, turning on Circuit 2 156;
31. determining if the external temperature is less than 46 degrees Fahrenheit 158;
32. if the external temperature is less than 46 degrees Fahrenheit 158, turn on superheat 160;
33. if the external temperature is greater than 46 degrees Fahrenheit determining if user has turned on superheat 162
34. determining if user value is equal to or less than the temperature 164;
35. if user value is equal to or less than the temperature, turning off Circuit 2 166; and
36. if user value is equal to or less than the temperature, turning off superheat 168.

If while the method is operable the wireless connectivity between a handheld digital device and the apparatus or system is lost, an alert step sends "Infant/Pet is Out of Range" to the user's separate handheld digital device 90.

The embodiments of the system and apparatus for an assembled integrated environmental infant pram 10, an assembled integrated pet environmental mat 210 and an assembled integrated infant foot muff 310 further provide a microprocessor implemented method including these steps:

1. during runtime execution of the real time heating/ cooling control method 100 on the microprocessor 22 running an application using real time ambient external temperature inputs and real time small, dosed environment temperature inputs, and capturing sequences of user input in response to one or more real time events confronting the temperature control method 100 within the real time heating and cooling environment of a respective embodiment the system;
2. for individual captured sequences, determining an outcome of the captured sequence regarding a real time event of the one or more real time heating and cooling events;
3. applying an automated response to the captured sequence based on the temperature control method 100 outcome;
4. storing the captured sequence and the control method outcome in a runtime memory within the microprocessor 22;
5. in response to a dynamic event confronting a computer controlled real time heating and cooling method within the environment for the respective embodiment the system, identifying one or more captured sequences based on a system status and microprocessor 22 controlled real time status associated with the heating and cooling environment of the respective embodiment and the system real time sensory event confronting the microprocessor 22 controlled real time event;
6. selecting a captured sequence from the one or more captured sequences based on the captured sequence, and the control method associated with the individual sequences; and
7. executing the selected captured sequence by the microprocessor 22 controlled real time heating and cooling method in response to the real time event confronting the microprocessor 22 controlled real time heating and cooling method within the real time environment.

In this microprocessor implemented method, at least the heating and cooling system efficiency can be increased by an artificial intelligent component learning the users input in response to one or more real time sensory virtual events confronting the control method 100 within the real time heating and cooling environment of the respective embodiment the system.

We claim:

1. A method of controlling the temperature for a small, closed environment, the method comprising the steps of:
    a) providing a system to control the temperature of a small, closed environment;
    b) starting the portable apparatus to control the temperature of a small, closed environment (the "device");
    c) determining whether the user has turned on the device;
    d) if the user has not turned on the device, evaluating whether input sensors 1 and 2 are greater than 1;
    e) if input sensors 1 and 2 are not greater than 1, turning on the device;
    f) if the user has not turned on the device or if input 1 and 2 sensors are greater than 1, evaluating the value of input sensor 3 (the temperature of the environment to be controlled; herein "current temperature");
    g) setting the temperature to the value of input sensor 3;
    h) evaluating the value of input sensor 4 and setting the value of input sensor 4 as the external temperature;
    i) determining if the user has set a separate value on input sensor 5;
    j) if the user has not set a separate value on input 5, sending a user alert "pet/infant in product, auto-climate system on";
    k) determining if the temperature is greater than 21 degrees Celsius;
    l) if the user has not set a separate value on input sensor 5, and if the temperature is greater than 21 degrees Celsius, turning on Circuit 1;
    m) determining if the temperature is less than 21 degrees Celsius while Circuit 1 is turned on;
    n) if the temperature is less than 21 degrees Celsius, turning Circuit 1 off;
    o) if the user has not set a separate value on input sensor 5, and if the temperature is not greater than 21 degrees Celsius or if Circuit 1 is turned off, determining if the temperature is less than 18 degrees Celsius;

p) if the temperature is less than 18 degrees Celsius, turning on Circuit 2;
q) determining if the external temperature is less than 8 degrees Celsius;
r) if the external temperature is less than 8 degrees Celsius, turning on superheat;
s) sending user alert ("Superheat On");
t) checking if the temperature less than 21 degrees Celsius;
u) if the temperature is not less than 21 degrees Celsius, turning off Circuit 2;
v) if the temperature is not less than 21 degrees Celsius, turning off superheat;
w) if the user has set a separate value on input 5, determining if the user input value is between 16 degrees Celsius and 27 degrees Celsius;
x) if the user has set a separate value on input sensor 5, determining if the user input value is less than the temperature;
y) if the user input value is less than the current, turning on Circuit 1;
z) determining if the user input value is equal to or greater than the temperature;
aa) if the user input value is greater than the temperature, turning off Circuit 1;
bb) determining if user input value is greater than the temperature;
cc) if the user input value is not greater than the temperature, determining if the user has entered a new user value, and returning to step c;
dd) if the user input value is greater than the temperature, turning on Circuit 2;
ee) determining if the external temperature is less than 8 degrees Celsius;
ff) if the external temperature is less than 8 degrees Celsius, turning on superheat;
gg) if the external temperature is greater than 8 degrees Celsius determining if user has turned on superheat;
hh) determining if user value is equal to or less than the temperature;
ii) if user value is equal to or less than the temperature, turning off Circuit 2;
jj) if user value is equal to or less than the temperature, turning off superheat; and
kk) if while the device is turned on the wireless connectivity between a handheld digital device and the device is lost, sending user an alert (infant/Pet is Out of Range").

2. The method of controlling the temperature for a small, closed environment of claim 1, the method further comprising a microprocessor implemented method comprising following steps:
a) during runtime execution of the real time heating/cooling control method on the microprocessor, running an application comprising real time ambient external temperature inputs and real time small, closed environment temperature inputs, and capturing sequences of user input in response to one or more real time events confronting the temperature control method within the real time heating and cooling environment of a respective embodiment of the system;
b) for individual captured sequences, determining an outcome of the captured sequence regarding a real time event of the one or more real time heating and cooling events;
c) applying an automated response to the captured sequence based on the control method outcome;
d) storing the captured sequence and the control method outcome in a runtime memory within the microprocessor;
e) in response to a dynamic event confronting a computer controlled real time heating and cooling method within the environment for a respective system embodiment, identifying one or more captured sequences based on a system status and microprocessor controlled real time status associated with the heating and cooling environment of the respective embodiment and the system real time sensory event confronting the microprocessor controlled real time event;
f) selecting a captured sequence from the one or more captured sequences based on the captured sequence, and the control method associated with the individual sequences; and
g) executing the selected captured sequence by the microprocessor controlled real time heating and cooling method in response to the real time event confronting the microprocessor controlled real time heating and cooling method within the real time environment.

3. A system for the method of controlling the temperature for a small, closed environment of claim 2, the system comprising, in combination:
a) portable apparatus to control the temperature of a small, closed environment;
b) at least one separate handheld digital device comprising wireless or Bluetooth connectivity with at least one microprocessor;
c) temperature control software resident in the at least one separate handheld digital device and the at least one microprocessor providing discrete heating and cooling control circuits to the small, closed environment based upon set points, real time system environmental dynamics, and alert warnings; and
d) temperature control firmware in the at least one microprocessor providing discrete heating and cooling control circuits to the small, closed environment based upon set points, real time system environmental dynamics, and alert warnings.

4. Portable apparatus for the system of claim 3, the apparatus comprising, in combination:
a) at least one microprocessor comprising at least one printed circuit board, wireless or Bluetooth connectivity, input and output programmable digital control function, and digital memory storage;
b) at least one superheating pad communicating with the at least one microprocessor;
c) at least one temperature sensor reading the temperature of the small, closed environment and communicating with the at least one microprocessor;
d) at least one temperature sensor reading the ambient air temperature outside the small, closed environment and communicating with the at least one microprocessor;
e) at least one pressure sensor embedded in the at least one superheating pad and communicating with the at least one microprocessor;
f) at least one first heat sink assembly comprising a fan directing the flow of air from the at least one first heat sink into the small, closed environment, and communicating with the at least one microprocessor;
g) at least one Peltier plate connected to at least one first heat sink comprising a fan directing the flow of air from the at least one first heat sink into the small, closed environment, and communicating with the at least one microprocessor;

h) at least one second heat sink assembly comprising a fan directing the flow of air from the at least one second heat sink assembly through an exhaust portal from the portable apparatus to control the temperature of the small, closed environment and direct the heated air to the ambient air environment, and communicating with the at least one microprocessor;

i) sealed vacuum copper heat pipes connecting the at least one first heat sink assembly and the at least one second heat sink assembly; and j) at least one rechargeable battery power supply connected to and providing electrical power for the at least one microprocessor, the at least one superheating pad, the at least one temperature sensor reading the temperature of the small, closed environment, the at least one temperature sensor reading the ambient air temperature outside the small closed environment; the at least one pressure sensor, the at least one first heat sink assembly, the at least one Peltier plate, and the at least one second heat sink assembly, the at least one power supply comprising a charging/direct connection.

5. Portable apparatus for the system of claim 4, wherein the small, closed environment comprises a space to house an infant in a pram, the apparatus comprising, in combination:

a) the at least one microprocessor, the at least one first heat sink assembly, the at least one Peltier plate, the sealed vacuum copper pipes, the at least one second heat sink assembly, and the at least one power supply comprising a charging/direct connection portable apparatus are housed in an enclosure releasably affixed to an underside of the pram, the underside of the pram comprising (i) at least one portal into the small closed environment for connecting the at least one superheating pad, the at least one temperature sensor reading the temperature of the small closed environment, and the at least one pressure sensor to the at least one microprocessor and the at least one power supply, and (ii) at least one portal into the small, closed environment for receiving the flow of conditioned air from the at least one first heat sink assembly;

b) the enclosure comprises (i) at least one portal for the exhaust of heated air from the enclosure, and (ii) at least one portal for connecting the at least one temperature sensor reading the ambient air temperature outside the enclosure; and c) the bottom surface of the small, closed environment comprises the at least one superheating pad and the at least one pressure sensor.

6. Portable apparatus for the system of claim 4, wherein the small, closed environment comprises a space to house an infant in a pram, the apparatus comprising, in combination:

a) the at least one microprocessor, the at least one first heat sink assembly, the at least one Peltier plate, the sealed vacuum copper pipes, the at least one second heat sink assembly, and the at least one power supply comprising a charging/direct connection portable apparatus are housed in an enclosed end of the pram, the enclosed end of the pram comprising (i) at least one portal from the enclosed end of the pram into the small closed environment for connecting the at least one superheating pad, the at least one temperature sensor reading the temperature of the small closed environment, and the at least one pressure sensor to the at least one microprocessor and the at least one power supply, (ii) at least one portal from the enclosed end of the pram into the small, closed environment for receiving the flow of conditioned air from the at least one first heat sink assembly, (iii) at least one portal from the enclosed end of the pram to the exterior ambient air environment on the outside of the pram for the exhaust of heated air from enclosed end of the pram, and (iv) at least one portal from the enclosed end of the pram for connecting the at least one temperature sensor reading the ambient air temperature outside the small, closed environment; and b) the bottom surface of the small, closed environment comprises the at least one superheating pad and the at least one pressure sensor.

7. Portable apparatus to control the system of claim 4, wherein the small, closed environment comprises a space to house the legs and lower torso of an infant in a footmuff, the apparatus comprising, in combination:

a) the at least one microprocessor, the at least one first heat sink assembly, the at least one Peltier plate, the sealed vacuum copper pipes, the at least one second heat sink assembly, and the at least one power supply comprising a charging/direct connection portable apparatus are housed in at least one enclosure releasably received into a pocket on a side of a footmuff, the pocket on the side of the footmuff comprising (i) at least one portal into the footmuff for connecting the at least one superheating pad, the at least one temperature sensor reading the temperature of the footmuff, and the at least one pressure sensor to the at least one microprocessor and the at least one power supply, (ii) at least one portal into the footmuff for receiving the flow of conditioned air from the at least one first heat sink assembly, and (iii) at least one portal for the exhaust of heated air from the footmuff into the ambient air outside of the footmuff;

b) the enclosure comprises at least one portal for connecting the at least one temperature sensor reading the ambient air temperature outside the footmuff; and c) an internal top surface of the footmuff surface comprises the at least one superheating pad and the at least one pressure sensor.

8. Portable apparatus to control the system of claim 4, wherein the small, closed environment comprises an array of ducts between a bottom layer and a top surface layer of a pet bed, the apparatus comprising, in combination:

a) the at least one microprocessor, the at least one first heat sink assembly, the at least one Peltier plate, the sealed vacuum copper pipes, the at least one second heat sink assembly, and the at least one power supply comprising a charging/direct connection portable apparatus are housed in a separate enclosed portion of the small, closed environment, the separate, enclosed portion of the small, closed environment of the pet bed comprising (i) at least one portal from the separate enclosed portion into the small, closed environment for connecting the at least one superheating pad, the at least one temperature sensor reading the temperature of the small closed environment, and the at least one pressure sensor to the at least one microprocessor and the at least one power supply, (ii) at least one portal from the separate enclosed portion into the small, closed environment for receiving the flow of conditioned air from the at least one first heat sink assembly, (iii) at least one portal from the separate, enclosed portion to the exterior ambient air environment on the outside of the pet bed for the exhaust of heated air from separate enclosed portion; and b) the top surface layer of the pet bed comprises the at least one superheating pad and the at least one pressure sensor.

9. Portable apparatus for the system of claim 3, the apparatus comprising, in combination:
   a) at least one microprocessor comprising at least one printed circuit board, wireless or Bluetooth connectivity, input and output programmable digital control function, and digital memory storage;
   b) at least one superheating pad communicating with the at least one microprocessor;
   c) at least one temperature sensor reading the temperature of the small, closed environment and communicating with the at least one microprocessor;
   d) at least one temperature sensor reading the ambient air temperature outside the small, closed environment and communicating with the at least one microprocessor;
   e) at least one pressure sensor embedded in the at least one superheating pad and communicating with the at least one microprocessor;
   f) at least one first heat sink assembly comprising a fan directing the flow of air from the at least one first heat sink into the small, closed environment, and communicating with the at least one microprocessor;
   g) at least one Peltier plate connected to at least one first heat sink comprising a fan directing the flow of air from the at least one first heat sink into the small, closed environment, and communicating with the at least one microprocessor;
   h) at least one second heat sink assembly comprising a fan directing the flow of air from the at least one second heat sink assembly through an exhaust portal from the portable apparatus to control the temperature of the small, closed environment and direct the heated air to the ambient air environment, and communicating with the at least one microprocessor; and
   i) at least one rechargeable battery power supply connected to and providing electrical power for the at least one microprocessor, the at least one superheating pad, the at least one temperature sensor reading the temperature of the small, closed environment, the at least one temperature sensor reading the ambient air temperature outside the small closed environment; the at least one pressure sensor, the at least one first heat sink assembly, the at least one Peltier plate, and the at least one second heat sink assembly, the at least one power supply comprising a charging/direct connection.

10. Portable apparatus for the system of claim 9, wherein the small, closed environment comprises a space to house an infant in a pram, the apparatus comprising, in combination:
   a) the at least one microprocessor, the at least one first heat sink assembly, the at least one Peltier plate, the at least one second heat sink assembly, and the at least one power supply comprising a charging/direct connection portable apparatus are housed in an enclosure releasably affixed to an underside of the pram, the underside of the pram comprising (i) at least one portal into the small closed environment for connecting the at least one superheating pad, the at least one temperature sensor reading the temperature of the small, closed environment, and the at least one pressure sensor to the at least one microprocessor and the at least one power supply, and (ii) at least one portal into the small closed environment for receiving the flow of conditioned air from the at least one first heat sink assembly;
   b) the enclosure comprises (i) at least one portal for the exhaust of heated air from the enclosure, and (ii) at least one portal for connecting the at least one temperature sensor reading the ambient air temperature outside the enclosure; and
   c) the bottom surface of the small, closed environment comprises the at least one superheating pad and the at least one pressure sensor.

11. Portable apparatus for the system of claim 9, wherein the small, closed environment comprises a space to house an infant in a pram, the apparatus comprising, in combination:
   a) the at least one microprocessor, the at least one first heat sink assembly, the at least one Peltier plate, the at least one second heat sink assembly, and the at least one power supply comprising a charging/direct connection portable apparatus are housed in an enclosed end of the pram, the enclosed end of the pram comprising (i) at least one portal from the enclosed end of the pram into the small closed environment for connecting the at least one superheating pad, the at least one temperature sensor reading the temperature of the small closed environment, and the at least one pressure sensor to the at least one microprocessor and the at least one power supply, (ii) at least one portal from the enclosed end of the pram into the small, closed environment for receiving the flow of conditioned air from the at least one first heat sink assembly, (iii) at least one portal from the enclosed end of the pram to the exterior ambient air environment on the outside of the pram for the exhaust of heated air from enclosed end of the pram, and (iv) at least one portal from the enclosed end of the pram for connecting the at least one temperature sensor reading the ambient air temperature outside the small, closed environment; and
   b) the bottom surface of the small, closed environment comprises the at least one superheating pad and the at least one pressure sensor.

12. Portable apparatus to control the system of claim 9, wherein the small, closed environment comprises a space to house the legs and lower torso of an infant in a footmuff, the apparatus comprising, in combination:
   a) the at least one microprocessor, the at least one first heat sink assembly, the at least one Peltier plate, the at least one second heat sink assembly, and the at least one power supply comprising a charging/direct connection portable apparatus are housed in at least one enclosure releasably received into a pocket on a side of a footmuff, the pocket on the side of the footmuff comprising (i) at least one portal into the footmuff for connecting the at least one superheating pad, the at least one temperature sensor reading the temperature of the footmuff, and the at least one pressure sensor to the at least one microprocessor and the at least one power supply, (ii) at least one portal into the footmuff for receiving the flow of conditioned air from the at least one first heat sink assembly, and (iii) at least one portal for the exhaust of heated air from the footmuff into the ambient air outside of the footmuff;
   b) the enclosure comprises at least one portal for connecting the at least one temperature sensor reading the ambient air temperature outside the enclosure; and
   c) an internal top surface of the footmuff comprises the at least one superheating pad and the at least one pressure sensor.

13. Portable apparatus to control the system of claim 9, wherein the small, enclosed environment comprises an array of ducts between a bottom layer and a top surface layer of a pet bed, the apparatus comprising, in combination:

a) the at least one microprocessor, the at least one first heat sink assembly, the at least one Peltier plate, the at least one second heat sink assembly, and the at least one power supply comprising a charging/direct connection portable apparatus are housed in a separate enclosed portion of the small, closed environment, the separate, enclosed portion of the small, closed environment of the pet bed comprising (i) at least one portal from the separate enclosed portion into the small, closed environment for connecting the at least one superheating pad, the at least one temperature sensor reading the temperature of the small closed environment, and the at least one pressure sensor to the at least one microprocessor and the at least one power supply, (ii) at least one portal from the separate enclosed portion into the small, closed environment for receiving the flow of conditioned air from the at least one first heat sink assembly, (iii) at least one portal from the separate, enclosed portion to the exterior ambient air environment on the outside of the pet bed for the exhaust of heated air from separate enclosed portion; and b) the top surface layer of the pet bed comprises the at least one superheating pad and the at least one pressure sensor.

\* \* \* \* \*